United States Patent
Jäckel et al.

(10) Patent No.: US 12,486,327 B2
(45) Date of Patent: *Dec. 2, 2025

(54) CAR FOR USE IN THE TREATMENT OF HvG DISEASE

(71) Applicants: MEDIZINISCHE HOCHSCHULE HANNOVER, Hannover (DE); TECHNISCHE UNIVERSITÄT BRAUNSCHWEIG, Braunschweig (DE)

(72) Inventors: Elmar Jäckel, Hannover (DE); Fatih Noyan, Hannover (DE); Michael Hust, Hannover (DE)

(73) Assignees: Medizinische Hochschule Hannover, Hannover (DE); Technische Universität Braunschweig, Braunschweig (DE)

( * ) Notice: Subject to any disclaimer, the term of this patent is extended or adjusted under 35 U.S.C. 154(b) by 1100 days.

This patent is subject to a terminal disclaimer.

(21) Appl. No.: 17/442,759

(22) PCT Filed: Mar. 30, 2020

(86) PCT No.: PCT/EP2020/059000
§ 371 (c)(1),
(2) Date: Sep. 24, 2021

(87) PCT Pub. No.: WO2020/201230
PCT Pub. Date: Oct. 8, 2020

(65) Prior Publication Data
US 2022/0289849 A1    Sep. 15, 2022

(30) Foreign Application Priority Data
Mar. 29, 2019 (EP) .................................... 19166421

(51) Int. Cl.
*C07K 16/28* (2006.01)
*A61K 40/11* (2025.01)
*A61K 40/31* (2025.01)
*A61P 37/06* (2006.01)

(52) U.S. Cl.
CPC .......... *C07K 16/2833* (2013.01); *A61K 40/11* (2025.01); *A61K 40/31* (2025.01); *A61P 37/06* (2018.01); *C07K 2317/24* (2013.01); *C07K 2317/53* (2013.01); *C07K 2317/622* (2013.01); *C07K 2317/92* (2013.01); *C07K 2319/03* (2013.01); *C07K 2319/33* (2013.01)

(58) Field of Classification Search
CPC ............ C07K 16/2833; C07K 2317/24; C07K 2317/53; C07K 2317/622; C07K 2317/92; C07K 2317/03; C07K 2319/33; A61K 40/11; A61K 40/31
USPC .......... 530/387.3; 435/328, 372.3; 424/93.21
See application file for complete search history.

(56) References Cited

U.S. PATENT DOCUMENTS 11,160,831 B2 * 11/2021 Jäckel .................... A61K 40/31
2021/0338726 A1 * 11/2021 Martinez-Llordella ......................
A61K 40/31

FOREIGN PATENT DOCUMENTS

| CN | 109265550 A | 1/2019 |
|---|---|---|
| CN | 109293773 A | 2/2019 |
| CN | 112969784 A | 6/2021 |
| WO | 2008095141 A2 | 8/2008 |
| WO | WO2013104804 A2 | 7/2013 |
| WO | 2015123642 A1 | 8/2015 |
| WO | 2017172981 A2 | 10/2017 |
| WO | WO/2018/001874 * | 1/2018 |
| WO | WO2018001874 A1 | 1/2018 |
| WO | 2018037103 A1 | 3/2018 |
| WO | WO2018183293 A1 | 10/2018 |
| WO | WO2020044055 A1 | 3/2020 |

OTHER PUBLICATIONS

Definition of "characterize"—Merriam Webbster Online Dictionary, accessed on Mar. 7, 2025, www.merriam-webster.com/dictionary/characterize.*
Vajdos et al. (2002) J. Mol. Biol., vol. 320, 415-428.*
Chen et al. (1992) J. Exp. Med., vol. 176, 855-866.*
Sela-Culang et al. (2013) Frontiers in Immunology, vol. 4, pp. 1-13.*
Elinav, et al., "Amelioration of Colitis by Genetically Engineered Murine Regulatory T Cells Redirected by Antigen-Specific Chimeric Receptor", Gastroenterology, 2009, vol. 136, pp. 1721-1731.
Reyes, et al., "Characterization of swine leucocyte antigen alleles in a crossbred pig to be used in xenotransplant studies", Tissue Antigens, 2014, vol. 84, pp. 484-488.
Office Action from EP Application No. 20 713 673.0 dated Jul. 19, 2023.
International Search Report from the corresponding International Patent Application No. PCT/EP2017/065472, dated Sep. 1, 2017.
Boardman, et al., "Expression of a Chimeric Antigen Receptor Specific for Donor HLA Class I Enhances the Potency of Human Regulatory T Cells in Preventing Human Skin Transplant Rejection", American Journal of Transplantation, 2017, 17: 931-943.
Office Action issued in Chinese Application No. 202080034929.X issued on Nov. 29, 2023.

(Continued)

*Primary Examiner* — Anne Marie S Wehbe
(74) *Attorney, Agent, or Firm* — Greer, Burns & Crain, Ltd.; Steven P. Fallon; E. Kate Berezutskaya

(57) ABSTRACT

The invention provides an optimized and far potent chimeric antigen receptor for its use in the treatment of HvG disease in a patient having received a transplant, for use in suppressing the hosts immune response directed against the transplant. The fusion protein is adapted for use in suppressing the immune rejection of a transplant which contains or expresses HLA-A*02 in a recipient patient who is negative for HLA-A*02, i.e. the patient prior to transplantation does not express HLA-A*02. The fusion protein is a chimeric antigen receptor (CAR), which upon expression in regulatory T-cells ($T_{reg}$) causes a specific suppressor activity of the regulatory T-cells in the presence of HLA-A*02.

22 Claims, 8 Drawing Sheets

Figure 1A:
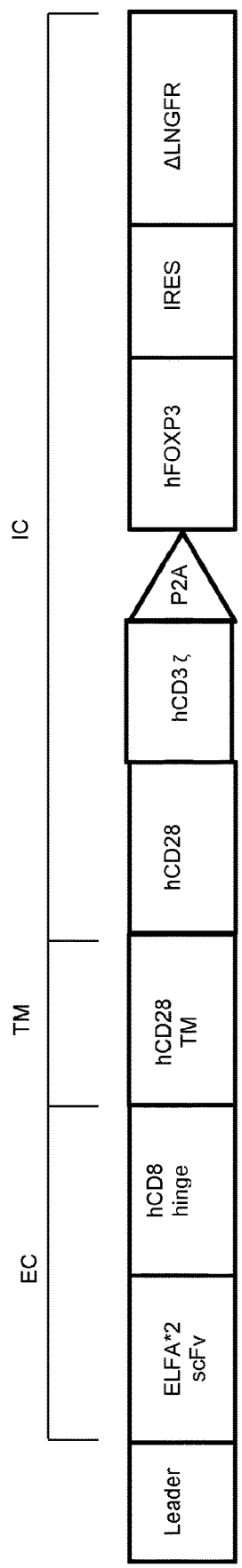

Specification includes a Sequence Listing.

(56) References Cited

OTHER PUBLICATIONS

Boardman et al., "Expression of a Chimeric Antigen Receptor Specific for Donor HLA Class I Enhances the Potency of Human Regulatory T Cells in Preventing Human Skin Transplant Rejection", American Journal oF Transplantation, Feb. 1, 2017, pp. 931-943, vol. 17, No. 4.

Macdonald et al., "Alloantigen-specific regulatory T cells generated with a chimeric antigen receptor", The Journal of Clinical Investigation, Apr. 1, 2016, pp. 1413-1424, vol. 126, No. 4.

Inaguma et al., "Construction and molecular characterization of a T-cell receptor-like antibody and CAR-T cells specific for minor histocompatibility antigen HA-1H", Gene Therapy, Apr. 3, 2014, pp. 575-584, vol. 6, No. 03.

Watkins et al., "The isolation and characterisation of human monoclonal HLA-A2 antibodies from an immune V gene phage display library", Tissue Antigens, Jan. 1, 2000, pp. 219-228.

Long et al., "Defects in IL-2R Signaling Contribute to Diminished Maintenance of FOXP3 Expression in CD4+CD25+ Regulatory T-Cells of Type 1 Diabetic Subjects", Diabetes, Feb. 2010, pp. 407-415, vol. 59.

Noyan et al., "Prevention of Allograft Rejection by Use of Regulatory T Cells with an MHC-Specific Chimeric Antigen Receptor", American Journal of Transplantation, 2017, pp. 917-930, vol. 17.

Noyan et al., "Induced Transgene Expression for the Treatment of Solid Tumors by Hematopoietic Stem Cell-Based Gene Therapy", Cancer Gene Therapy, 2012, pp. 352-357, vol. 19.

Galla et al., "Avoiding Cytotoxicity of Transposases by Dose-Controlled mRNA Delivery", Nucleic Acids Research, 2011, pp. 7147-7160, vol. 39, No. 16.

Di Stasi, et al., "Inducible Apoptosis as a Safety Switch for Adoptive Cell Therapy", The New England Journal of Medicine, Nov. 3, 2011, pp. 1673-1683, vol. 365. No. 18.

Hombach et al., "Adoptive Immunotherapy with Genetically Eingeered T cells: modification of the IgG1 Fc 'spacer Domain in the Extracellular Moiety of Chimeric Antigen Receptors Avoids 'off-target' Activation and Unintended Initiation of an Innate Response" Gene Therapy, 2010, pp. 1206-1213, vol. 17.

PCT Notification of Transmittal of the International Search Report and the Written Opinion of the International Searching Authority, or the Declaration dated May 27, 2020 for PCT Application No. PCT/EP2020/059000.

Chinese Office Action from the corresponding Chinese Patent Application No. 202080034929, dated Jun. 28, 2024.

Fransson, et al., "CAR/FoxP3-engineered T regulatory cells target the CNS and suppress EAE upon intranasal delivery", Journal of Neuroinflammation, 2012, 9:112, pp. 1-12.

Noyan, et al,. "Isolation of human antigen-specific regulatory T cells with high suppressive function", Eur. J. Immunol., 2014, 44, pp. 2592-2602.

\* cited by examiner

SEQUENCE LISTING

```
<160> NUMBER OF SEQ ID NOS: 11

<210> SEQ ID NO 1
<211> LENGTH: 81
<212> TYPE: PRT
<213> ORGANISM: Artificial Sequence
<220> FEATURE:
<223> OTHER INFORMATION: CD8 hinge domain and transmembran domain

<400> SEQUENCE: 1

Phe Val Pro Val Phe Leu Pro Ala Lys Pro Thr Thr Thr Pro Ala Pro
1               5                   10                  15

Arg Pro Pro Thr Pro Ala Pro Thr Ile Ala Ser Gln Pro Leu Ser Leu
            20                  25                  30

Arg Pro Glu Ala Ser Arg Pro Ala Ala Gly Gly Ala Val His Thr Arg
        35                  40                  45

Gly Leu Asp Phe Ala Asp Ile Tyr Ile Trp Ala Pro Leu Ala Gly Thr
    50                  55                  60

Cys Gly Val Leu Leu Leu Ser Leu Val Ile Thr Leu Tyr Cys Asn His
65                  70                  75                  80

Arg

<210> SEQ ID NO 2
<211> LENGTH: 42
<212> TYPE: PRT
<213> ORGANISM: Artificial Sequence
<220> FEATURE:
<223> OTHER INFORMATION: CD28 signalling domain

<400> SEQUENCE: 2

Trp Val Arg Ser Lys Arg Ser Arg Leu Leu His Ser Asp Tyr Met Asn
1               5                   10                  15

Met Thr Pro Arg Arg Pro Gly Pro Thr Arg Lys His Tyr Gln Pro Tyr
            20                  25                  30

Ala Pro Pro Arg Asp Phe Ala Ala Tyr Arg
        35                  40

<210> SEQ ID NO 3
<211> LENGTH: 113
<212> TYPE: PRT
<213> ORGANISM: Artificial Sequence
<220> FEATURE:
<223> OTHER INFORMATION: CD3zeta signalling domain
```

```
<400> SEQUENCE: 3

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65              70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

Ser

<210> SEQ ID NO 4
<211> LENGTH: 280
<212> TYPE: PRT
<213> ORGANISM: Artificial Sequence
<220> FEATURE:
<223> OTHER INFORMATION: hNFC IgG domain

<400> SEQUENCE: 4

Met Gly Ala Gly Ala Thr Gly Arg Ala Met Asp Gly Pro Arg Leu Leu
1               5                   10                  15

Leu Leu Leu Leu Leu Gly Val Ser Leu Gly Gly Ala Lys Glu Ala Cys
            20                  25                  30

Pro Thr Gly Leu Tyr Thr His Ser Gly Glu Cys Cys Lys Ala Cys Asn
        35                  40                  45

Leu Gly Glu Gly Val Ala Gln Pro Cys Gly Ala Asn Gln Thr Val Cys
    50                  55                  60

Glu Pro Cys Leu Asp Ser Val Thr Phe Ser Asp Val Val Ser Ala Thr
65              70                  75                  80

Glu Pro Cys Lys Pro Cys Thr Glu Cys Val Gly Leu Gln Ser Met Ser
                85                  90                  95

Ala Pro Cys Val Glu Ala Asp Ala Val Cys Arg Cys Ala Tyr Gly Tyr
            100                 105                 110

Tyr Tyr Gln Asp Glu Thr Thr Gly Arg Cys Glu Ala Cys Arg Val Cys
        115                 120                 125

Glu Ala Gly Ser Gly Leu Val Phe Ser Cys Gln Asp Lys Gln Asn Thr
    130                 135                 140

Val Cys Glu Glu Cys Pro Asp Gly Thr Tyr Ser Asp Glu Ala Asn His
145             150                 155                 160

Val Asp Pro Cys Leu Pro Cys Thr Val Cys Glu Asp Thr Glu Arg Gln
                165                 170                 175

Leu Arg Glu Cys Thr Arg Trp Ala Asp Ala Glu Cys Glu Glu Ile Pro
            180                 185                 190

Gly Arg Trp Ile Thr Arg Ser Thr Pro Pro Glu Gly Ser Asp Ser Thr
        195                 200                 205

Ala Pro Ser Thr Gln Glu Pro Glu Ala Pro Pro Glu Gln Asp Leu Ile
    210                 215                 220

Ala Ser Thr Val Ala Gly Val Val Thr Thr Val Met Gly Ser Ser Gln
```

```
                225                 230                 235                 240
Pro Val Val Thr Arg Gly Thr Thr Asp Asn Leu Ile Pro Val Tyr Cys
                    245                 250                 255

Ser Ile Leu Ala Ala Val Val Gly Leu Val Ala Tyr Ile Ala Phe
                260                 265                 270

Lys Arg Trp Asn Arg Gly Ile Leu
                275                 280

<210> SEQ ID NO 5
<211> LENGTH: 184
<212> TYPE: PRT
<213> ORGANISM: Artificial Sequence
<220> FEATURE:
<223> OTHER INFORMATION: hCD28 transmembrane domain - hCD3zeta
      signalling domain

<400> SEQUENCE: 5

Asp Pro Lys Phe Trp Val Leu Val Val Gly Gly Val Leu Ala Cys
1               5                   10                  15

Tyr Ser Leu Leu Val Thr Val Ala Phe Ile Ile Phe Trp Val Arg Ser
                20                  25                  30

Lys Arg Ser Arg Leu Leu His Ser Asp Tyr Met Asn Met Thr Pro Arg
                35                  40                  45

Arg Pro Gly Pro Thr Arg Lys His Tyr Gln Ala Tyr Ala Ala Ala Arg
            50                  55                  60

Asp Phe Ala Ala Tyr Arg Ser Leu Arg Val Lys Phe Ser Arg Ser Ala
65                  70                  75                  80

Asp Ala Pro Ala Tyr Gln Gln Gly Gln Asn Gln Leu Tyr Asn Glu Leu
                85                  90                  95

Asn Leu Gly Arg Arg Glu Glu Tyr Asp Val Leu Asp Lys Arg Arg Gly
                100                 105                 110

Arg Asp Pro Glu Met Gly Gly Lys Pro Arg Arg Lys Asn Pro Gln Glu
            115                 120                 125

Gly Leu Tyr Asn Glu Leu Gln Lys Asp Lys Met Ala Glu Ala Tyr Ser
130                 135                 140

Glu Ile Gly Met Lys Gly Glu Arg Arg Arg Gly Lys Gly His Asp Gly
145                 150                 155                 160

Leu Tyr Gln Gly Leu Ser Thr Ala Thr Lys Asp Thr Tyr Asp Ala Leu
                165                 170                 175

His Met Gln Ala Leu Pro Pro Arg
                180

<210> SEQ ID NO 6
<211> LENGTH: 452
<212> TYPE: PRT
<213> ORGANISM: Artificial Sequence
<220> FEATURE:
<223> OTHER INFORMATION: fusion P2A hFOXP3

<400> SEQUENCE: 6

Gly Ala Thr Asn Phe Ser Leu Leu Lys Gln Ala Gly Asp Val Glu Glu
1               5                   10                  15

Asn Pro Gly Pro Ser Met Pro Asn Pro Arg Pro Gly Lys Pro Ser Ala
                20                  25                  30

Pro Ser Leu Ala Leu Gly Pro Ser Pro Gly Ala Ser Pro Ser Trp Arg
            35                  40                  45

Ala Ala Pro Lys Ala Ser Asp Leu Leu Gly Ala Arg Gly Pro Gly Gly
50                  55                  60
```

Thr Phe Gln Gly Arg Asp Leu Arg Gly Gly Ala His Ala Ser Ser Ser
65                  70                  75                  80

Ser Leu Asn Pro Met Pro Pro Ser Gln Leu Gln Leu Pro Thr Leu Pro
            85                  90                  95

Leu Val Met Val Ala Pro Ser Gly Ala Arg Leu Gly Pro Leu Pro His
            100                 105                 110

Leu Gln Ala Leu Leu Gln Asp Arg Pro His Phe Met His Gln Leu Ser
            115                 120                 125

Thr Val Asp Ala His Ala Arg Thr Pro Val Leu Gln Val His Pro Leu
130                 135                 140

Glu Ser Pro Ala Met Ile Ser Leu Thr Pro Thr Thr Ala Thr Gly
145                 150                 155                 160

Val Phe Ser Leu Lys Ala Arg Pro Gly Leu Pro Pro Gly Ile Asn Val
            165                 170                 175

Ala Ser Leu Glu Trp Val Ser Arg Glu Pro Ala Leu Leu Cys Thr Phe
            180                 185                 190

Pro Asn Pro Ser Ala Pro Arg Lys Asp Ser Thr Leu Ser Ala Val Pro
            195                 200                 205

Gln Ser Ser Tyr Pro Leu Leu Ala Asn Gly Val Cys Lys Trp Pro Gly
210                 215                 220

Cys Glu Lys Val Phe Glu Glu Pro Glu Asp Phe Leu Lys His Cys Gln
225                 230                 235                 240

Ala Asp His Leu Leu Asp Glu Lys Gly Arg Ala Gln Cys Leu Leu Gln
                245                 250                 255

Arg Glu Met Val Gln Ser Leu Glu Gln Gln Leu Val Leu Glu Lys Glu
                260                 265                 270

Lys Leu Ser Ala Met Gln Ala His Leu Ala Gly Lys Met Ala Leu Thr
            275                 280                 285

Lys Ala Ser Ser Val Ala Ser Ser Asp Lys Gly Ser Cys Cys Ile Val
            290                 295                 300

Ala Ala Gly Ser Gln Gly Pro Val Val Pro Ala Trp Ser Gly Pro Arg
305                 310                 315                 320

Glu Ala Pro Asp Ser Leu Phe Ala Val Arg Arg His Leu Trp Gly Ser
                325                 330                 335

His Gly Asn Ser Thr Phe Pro Glu Phe Leu His Asn Met Asp Tyr Phe
            340                 345                 350

Lys Phe His Asn Met Arg Pro Pro Phe Thr Tyr Ala Thr Leu Ile Arg
            355                 360                 365

Trp Ala Ile Leu Glu Ala Pro Glu Lys Gln Arg Thr Leu Asn Glu Ile
            370                 375                 380

Tyr His Trp Phe Thr Arg Met Phe Ala Phe Arg Asn His Pro Ala
385                 390                 395                 400

Thr Trp Lys Asn Ala Ile Arg His Asn Leu Ser Leu His Lys Cys Phe
                405                 410                 415

Val Arg Val Glu Ser Glu Lys Gly Ala Val Trp Thr Val Asp Glu Leu
            420                 425                 430

Glu Phe Arg Lys Lys Arg Ser Gln Arg Pro Ser Arg Cys Ser Asn Pro
            435                 440                 445

Thr Pro Gly Pro
450

<210> SEQ ID NO 7
<211> LENGTH: 280

```
<212> TYPE: PRT
<213> ORGANISM: Artificial Sequence
<220> FEATURE:
<223> OTHER INFORMATION: N LNGFR (reporter)

<400> SEQUENCE: 7
```

Met Gly Ala Gly Ala Thr Gly Arg Ala Met Asp Gly Pro Arg Leu Leu
1               5                   10                  15

Leu Leu Leu Leu Leu Gly Val Ser Leu Gly Gly Ala Lys Glu Ala Cys
                20                  25                  30

Pro Thr Gly Leu Tyr Thr His Ser Gly Glu Cys Cys Lys Ala Cys Asn
            35                  40                  45

Leu Gly Glu Gly Val Ala Gln Pro Cys Gly Ala Asn Gln Thr Val Cys
50                  55                  60

Glu Pro Cys Leu Asp Ser Val Thr Phe Ser Asp Val Val Ser Ala Thr
65                  70                  75                  80

Glu Pro Cys Lys Pro Cys Thr Glu Cys Val Gly Leu Gln Ser Met Ser
                85                  90                  95

Ala Pro Cys Val Glu Ala Asp Asp Ala Val Cys Arg Cys Ala Tyr Gly
            100                 105                 110

Tyr Tyr Gln Asp Glu Thr Thr Gly Arg Cys Glu Ala Cys Arg Val Cys
            115                 120                 125

Glu Ala Gly Ser Gly Leu Val Phe Ser Cys Gln Asp Lys Gln Asn Thr
130                 135                 140

Val Cys Glu Glu Cys Pro Asp Gly Thr Tyr Ser Asp Glu Ala Asn His
145                 150                 155                 160

Val Asp Pro Cys Leu Pro Cys Thr Val Cys Glu Asp Thr Glu Arg Gln
                165                 170                 175

Leu Arg Glu Cys Thr Arg Trp Ala Asp Ala Glu Cys Glu Glu Ile Pro
            180                 185                 190

Gly Arg Trp Ile Thr Arg Ser Thr Pro Pro Glu Gly Ser Asp Ser Thr
            195                 200                 205

Ala Pro Ser Thr Gln Glu Pro Glu Ala Pro Pro Glu Gln Asp Leu Ile
            210                 215                 220

Ala Ser Thr Val Ala Gly Val Val Thr Thr Val Met Gly Ser Ser Gln
225                 230                 235                 240

Pro Val Val Thr Arg Gly Thr Thr Asp Asn Leu Ile Pro Val Tyr Cys
                245                 250                 255

Ser Ile Leu Ala Ala Val Val Val Gly Leu Val Ala Tyr Ile Ala Phe
            260                 265                 270

Lys Arg Trp Asn Arg Gly Ile Leu
            275                 280

```
<210> SEQ ID NO 8
<211> LENGTH: 21
<212> TYPE: PRT
<213> ORGANISM: Artificial Sequence
<220> FEATURE:
<223> OTHER INFORMATION: secretory leader peptide

<400> SEQUENCE: 8
```

Met Ala Leu Pro Val Thr Ala Leu Leu Leu Pro Leu Ala Leu Leu Leu
1               5                   10                  15

His Ala Ala Ala Pro
            20

```
<210> SEQ ID NO 9
```

```
<211> LENGTH: 246
<212> TYPE: PRT
<213> ORGANISM: Artificial Sequence
<220> FEATURE:
<221> NAME/KEY: CHAIN
<222> LOCATION: 1..123
<223> OTHER INFORMATION: heavy chain variable region
<220> FEATURE:
<223> OTHER INFORMATION: scFv (ELFA*2)
<220> FEATURE:
<221> NAME/KEY: CHAIN
<222> LOCATION: 26..33
<223> OTHER INFORMATION: CDR1
<220> FEATURE:
<221> NAME/KEY: CHAIN
<222> LOCATION: 51..58
<223> OTHER INFORMATION: CDR2
<220> FEATURE:
<221> NAME/KEY: CHAIN
<222> LOCATION: 97..112
<223> OTHER INFORMATION: CDR3
<220> FEATURE:
<221> NAME/KEY: CHAIN
<222> LOCATION: 124..139
<223> OTHER INFORMATION: linker
<220> FEATURE:
<221> NAME/KEY: CHAIN
<222> LOCATION: 140..246
<223> OTHER INFORMATION: light chain variable kappa
<220> FEATURE:
<221> NAME/KEY: CHAIN
<222> LOCATION: 166..171
<223> OTHER INFORMATION: CDR1
<220> FEATURE:
<221> NAME/KEY: CHAIN
<222> LOCATION: 189..191
<223> OTHER INFORMATION: CDR2
<220> FEATURE:
<221> NAME/KEY: CHAIN
<222> LOCATION: 228..237
<223> OTHER INFORMATION: CDR3

<400> SEQUENCE: 9
```

Gln Val Gln Leu Val Gln Ser Gly Gly Gly Val Val Gln Pro Gly Gly
 1               5                  10                  15

Ser Leu Arg Val Ser Cys Ala Ala Ser Gly Val Thr Leu Ser Asp Tyr
             20                  25                  30

Gly Met His Trp Val Arg Gln Ala Pro Gly Lys Gly Leu Glu Trp Val
         35                  40                  45

Ala Phe Ile Arg Asn Asp Gly Ser Asp Lys Tyr Ala Asp Ser Val
     50                  55                  60

Lys Gly Arg Phe Thr Ile Ser Arg Asp Asn Ser Lys Thr Val Ser
 65                  70                  75                  80

Leu Gln Met Ser Ser Leu Arg Ala Glu Asp Thr Ala Val Tyr Tyr Cys
                 85                  90                  95

Ala Lys Asn Gly Glu Ser Gly Pro Leu Asp Tyr Trp Tyr Leu Asp Leu
            100                 105                 110

Trp Gly Arg Gly Thr Leu Val Thr Val Ser Ser Gly Gly Gly Ser
            115                 120                 125

Gly Gly Gly Gly Ser Gly Gly Gly Ser Thr Asp Val Val Met Thr
        130                 135                 140

Gln Ser Pro Ser Ser Leu Ser Ala Ser Val Gly Asp Arg Val Thr Ile
145                 150                 155                 160

Thr Cys Gln Ser Ser Leu Asp Ile Ser His Tyr Leu Asn Trp Tyr Gln
                165                 170                 175

Gln Lys Pro Gly Lys Ala Pro Lys Leu Leu Ile Tyr Asp Ala Ser Asn
            180                 185                 190

```
Leu Glu Thr Gly Val Pro Ser Arg Phe Ser Gly Ser Gly Ser Gly Thr
            195                 200                 205

His Phe Thr Phe Thr Ile Ser Ser Leu Gln Pro Glu Asp Phe Ala Thr
            210                 215                 220

Tyr Tyr Cys Gln Gln Tyr Asp Asn Leu Pro Leu Thr Phe Gly Gly Gly
225                 230                 235                 240

Thr Lys Leu Glu Ile Lys
                245
```

<210> SEQ ID NO 10
<211> LENGTH: 21
<212> TYPE: PRT
<213> ORGANISM: Artificial Sequence
<220> FEATURE:
<223> OTHER INFORMATION: CD28 extracellular domain signal peptide

<400> SEQUENCE: 10

```
Met Ala Leu Pro Val Thr Ala Leu Leu Leu Pro Leu Ala Leu Leu Leu
1               5                   10                  15

His Ala Ala Ala Pro
            20
```

<210> SEQ ID NO 11
<211> LENGTH: 245
<212> TYPE: PRT
<213> ORGANISM: Artificial Sequence
<220> FEATURE:
<221> NAME/KEY: CHAIN
<222> LOCATION: 1..123
<223> OTHER INFORMATION: heavy chain variable region
<220> FEATURE:
<223> OTHER INFORMATION: variant ELFA*2
<220> FEATURE:
<221> NAME/KEY: CHAIN
<222> LOCATION: 124..138
<223> OTHER INFORMATION: linker
<220> FEATURE:
<221> NAME/KEY: CHAIN
<222> LOCATION: 139..245
<223> OTHER INFORMATION: light chain varible kappa

<400> SEQUENCE: 11

```
Gln Val Gln Leu Val Gln Ser Gly Gly Gly Val Val Gln Pro Gly Gly
1               5                   10                  15

Ser Leu Arg Val Ser Cys Ala Ala Ser Gly Val Thr Leu Ser Asp Tyr
            20                  25                  30

Gly Met His Trp Val Arg Gln Ala Pro Gly Lys Gly Leu Glu Trp Val
            35                  40                  45

Ala Phe Ile Arg Asn Asp Gly Ser Asp Lys Tyr Tyr Ala Asp Ser Val
50                  55                  60

Lys Gly Arg Phe Thr Ile Ser Arg Asp Asn Ser Glu Lys Thr Val Ser
65                  70                  75                  80

Leu Gln Met Ser Ser Leu Arg Ala Glu Asp Thr Ala Val Tyr Tyr Cys
            85                  90                  95

Ala Lys Asn Gly Glu Ser Gly Pro Leu Asp Tyr Trp Tyr Leu Asp Leu
            100                 105                 110

Trp Gly Arg Gly Thr Leu Val Thr Val Ser Ser Gly Gly Gly Gly Ser
            115                 120                 125

Gly Gly Gly Gly Ser Gly Gly Gly Ser Asp Val Val Met Thr Gln
            130                 135                 140

Ser Pro Ser Ser Leu Ser Ala Ser Val Gly Asp Arg Val Thr Ile Thr
```

```
                    145                 150                 155                 160

Cys Gln Ser Ser Leu Asp Ile Ser His Tyr Leu Asn Trp Tyr Gln Gln
                165                 170                 175

Lys Pro Gly Lys Ala Pro Lys Leu Leu Ile Tyr Asp Ala Ser Asn Leu
                180                 185                 190

Glu Thr Gly Val Pro Ser Arg Phe Ser Gly Ser Gly Ser Gly Thr His
                195                 200                 205

Phe Thr Phe Thr Ile Ser Ser Leu Gln Pro Glu Asp Phe Ala Thr Tyr
                210                 215                 220

Tyr Cys Gln Gln Tyr Asp Asn Leu Pro Leu Thr Phe Gly Gly Gly Thr
225                 230                 235                 240

Lys Leu Glu Ile Lys
                245
```

CAR FOR USE IN THE TREATMENT OF HvG DISEASE

The present invention relates to a fusion protein, which is a CAR, for use in the treatment of HvG disease in a patient having received a transplant, for use in suppressing the host's immune response directed against the transplant. The fusion protein is adapted for use in suppressing the immune rejection of a transplant which contains or expresses an MHC class I molecule, which is the human HLA-A*02 in a recipient patient who is negative for HLA-A*02, i.e. the patient prior to transplantation does not express HLA-A*02. The fusion protein is a chimeric antigen receptor (CAR-A*02), which upon expression in regulatory T-cells ($T_{reg}$) causes a specific suppressor activity of the regulatory T-cells in the presence of HLA-A*02. It is an advantage of the CAR-A*02 of the invention that the suppressor activity is limited to the transplant and results in the suppression of cytotoxic T-cells within the transplant, including cytotoxic T-cells directed against the transplant expressing HLA-A*02. The transplant is e.g. a solid tissue, single cells or a portion of a solid tissue, or nucleated blood cells.

The fusion protein comprises or consists of a single-chain variable fragment antibody domain (scFv), a modified hCD8 hinge, a hCD8 transmembrane domain, an intracellular hCD28 signalling domain and an intracellular hCD3ζ (hCD3 zeta) signalling domain, which preferably are linked to one another from N-terminus to C-terminus, more preferably directly linked to one another form N-terminus to C-terminus.

The fusion protein can contain a hΔFc IgG domain in the alternative to a modified hCD8 hinge, and/or a fusion hCD28 transmembrane domain—hCD28/CD3 zeta domain in the alternative to a hCD8 transmembrane domain, an intracellular hCD28 signalling domain and an intracellular hCD3ζ (hCD3 zeta) signalling domain.

Further, the invention relates to a nucleic acid sequence encoding the CAR fusion protein, preferably contained in a viral vector, e.g. between a 5'LTR and a 3'LTR, the nucleic acid sequence more preferably being contained in a viral particle suitable for transducing Treg cells. Therein, the nucleic acid sequence and a viral vector, preferably contained in a viral particle, are for use in the treatment of Host-versus-Graft (HvG) disease. According to the invention, the treatment of HvG disease generally is the suppression of cytotoxic T-cell activity directed against the transplanted graft.

Further, the invention relates to an in vitro method for introducing suppressor activity specific for HLA-A*02 by expressing the fusion protein according to the invention in Treg cells, e.g. by introducing a nucleic acid sequence encoding the fusion protein CAR-A*02 into Treg cells, which Treg cells generally do not contain or express HLA-A*02, and preferably the Treg cells are homogenic to the patient, e.g. obtained and isolated from a biopsy of the patient. The invention provides a method of treatment of HvG disease, comprising the administration of Treg cells expressing the fusion protein CAR-A*02 according to the invention to the patient.

PRIOR ART

MacDonald et al., The Journal of Clinical Investigation 1-12 (22 Mar. 2016) describes a generic CAR having an scFv domain specific for HLA-A2, and regulatory T-cells transduced for expressing the CAR for HLA-A2-specific suppression. The scFv domain contained the heavy and light chain variable regions of the monoclonal antibody BB7.2. In addition to the scFv, the CAR contained a CD28 transmembrane domain, a CD28 signalling domain and a CD3ζ signalling domain.

Inaguma et al., Gene Therapy 575-584 (2014) describe the construction of a T-cell receptor useful for directing T-lymphocytes against tumour cells that express a specific protein, comprising isolation of an antibody scFv having specificity for the tumour-specific protein when bound in a HLA-A2 complex, and using the scFv as a domain in the synthetic T-cell receptor.

Noyan et al., Cancer Gene Therapy 19, 352-357 (2012) describe induced transgene expression in hematopoietic stem and progenitor cells by lentiviral transduction for use in the treatment of solid tumours.

Galla et al., Nuc. Ac. Res. 39, 1721-1731 (2009) describe the cytotoxic effects of transposase used in transduction of cells by retroviral particles.

DiStasi et al., N Engl J Med 1673-1683 (2011) describe the genetic manipulation by introduction of sequences encoding caspase-9 dimerizer to generate a system for inducible apoptosis in the cells.

Long et al., Diabetes, 407-415 (2010) describe an assay for measuring STAT5 phosphorylation in the signalling pathway of IL-2R.

Hombach et al., Gene Therapy 1206-1213 (2010) describe a CAR for use in directing T-cells against a specific antigen, the CAR containing a modified IgG1 Fc spacer domain between an scFv and the transmembrane domain, to which transmembrane domain a signalling domain (CD28-CD3ζ) is attached.

WO 2018/001874 describes generic CAR molecules for expression in Treg cells for use in the treatment of HvG disease in a transplant recipient.

OBJECT OF THE INVENTION

The object of the invention is the provision of an alternative chimeric antigen receptor CAR suitable for providing Treg cells with suppressor activity for an MHC class I, especially for HLA-A*02, sufficiently strong to suppress the cytotoxic rejection of a transplant expressing the MHC class I, e.g. HLA-A*02, especially in a recipient patient who is HLA-A*02 negative, for use in the treatment of HvG disease.

DESCRIPTION OF THE INVENTION

The invention achieves the object by the features of the claims, especially by providing a fusion protein which is chimeric antigen receptor (CAR), especially CAR-A*02 which contains an scFv domain that is specific for the human HLA-A*02, which CAR-A*02 is for use in the treatment of HvG disease, e.g. for use in the treatment of cytotoxic rejection reactions in transplant recipient patients. The CAR-A*02 provides for suppression of cytotoxic T-cells when the CAR-A*02 is expressed in human Treg cells in the presence of the human HLA-A*02. The CAR-A*02 of the invention has SEQ ID NO: 9 as its scFv domain, which is also designated ELFA*2

(Gln Val Gln Leu Val Gln Ser Gly Gly Gly Val Val Gln
Pro Gly Gly Ser Leu Arg Val Ser Cys Ala Ala Ser Gly Val Thr Leu Ser Asp Tyr Gly Met
His Trp Val Arg Gln Ala Pro Gly Lys Gly Leu Glu Trp Val Ala Phe Ile Arg Asn Asp Gly
Ser Asp Lys Tyr Tyr Ala Asp Ser Val Lys Gly Arg Phe Thr Ile Ser Arg Asp Asn Ser Glu Lys
Thr Val Ser Leu Gln Met Ser Ser Leu Arg Ala Glu Asp Thr Ala Val Tyr Tyr Cys Ala Lys
Asn Gly Glu Ser Gly Pro Leu Asp Tyr Trp Tyr Leu Asp Leu Trp Gly Arg Gly Thr Leu
Val Thr Val Ser Ser Gly Gly Gly Gly Ser Gly Gly Gly Gly Ser Gly Gly Gly Gly Ser Thr Asp
Val Val Met Thr Gln Ser Pro Ser Ser Leu Ser Ala Ser Val Gly Asp Arg Val Thr Ile Thr Cys
Gln Ser Ser Leu Asp Ile Ser His Tyr Leu Asn Trp Tyr Gln Gln Lys Pro Gly Lys Ala Pro Lys
Leu Leu Ile Tyr Asp Ala Ser Asn Leu Glu Thr Gly Val Pro Ser Arg Phe Ser Gly Ser Gly Ser
Gly Thr His Phe Thr Phe Thr Ile Ser Ser Leu Gln Pro Glu Asp Phe Ala Thr Tyr Tyr Cys Gln
Gln Tyr Asp Asn Leu Pro Leu Thr Phe Gly Gly Gly Thr Lys Leu Glu Ile Lys).

In a variant, ELFA*2 has

SEQ ID NO: 11

(Gln Val Gln Leu Val Gln Ser Gly Gly Gly Val Val Gln Pro
Gly Gly Ser Leu Arg Val Ser Cys Ala Ala Ser Gly Val Thr Leu Ser Asp Tyr Gly Met His Trp
Val Arg Gln Ala Pro Gly Lys Gly Leu Glu Trp Val Ala Phe Ile Arg Asn Asp Gly Ser Asp Lys
Tyr Tyr Ala Asp Ser Val Lys Gly Arg Phe Thr Ile Ser Arg Asp Asn Ser Glu Lys Thr Val Ser
Leu Gln Met Ser Ser Leu Arg Ala Glu Asp Thr Ala Val Tyr Tyr Cys Ala Lys Asn Gly Glu
Ser Gly Pro Leu Asp Tyr Trp Tyr Leu Asp Leu Trp Gly Arg Gly Thr Leu Val Thr Val Ser Ser
Gly Gly Gly Gly Ser Gly Gly Gly Gly Ser Gly Gly Gly Gly Ser Asp Val Val Met Thr Gln Ser
Pro Ser Ser Leu Ser Ala Ser Val Gly Asp Arg Val Thr Ile Thr Cys Gln Ser Ser Leu Asp Ile
Ser His Tyr
Leu Asn Trp Tyr Gln Gln Lys Pro Gly Lys Ala Pro Lys Leu Leu Ile Tyr Asp Ala Ser Asn Leu
Glu Thr Gly Val Pro Ser Arg Phe Ser Gly Ser Gly Ser Gly Thr His Phe Thr Phe Thr Ile Ser
Ser Leu Gln Pro Glu Asp Phe Ala Thr Tyr Tyr Cys Gln Gln Tyr Asp Asn Leu Pro Leu Thr
Phe Gly Gly Gly Thr Lys Leu Glu Ile Lys).

Optionally, at the N-terminus of ELFA*2, a signal peptide (Met Ala Leu Pro Val Thr Ala Leu Leu Leu Pro Leu Ala Leu Leu Leu His Ala Ala Ala Pro, SEQ ID NO: 10) is arranged, and encoded on a nucleic acid sequence encoding the CAR-A*02. The CAR-A*02 containing SEQ ID NO: 9 as its scFv domain, when expressed in a human Treg cell, and respectively the human Treg cell expressing this CAR-A*02, is a pharmaceutical compound for the treatment of HvG disease. The scFv of SEQ ID NO: 9, and respectively of SEQ ID NO: 11, contains, from N-terminus to C-terminus, a heavy chain variable region (VH1), a linker, and a light chain variable region (VL kappa). In the heavy chain portion and in the light chain (kappa) portion, the complementary determining regions (CDR) are marked by underlining and bold face.

In the heavy chain portion, CDR1 is Gly Val Thr Leu Ser Asp Tyr Gly (SEQ ID NO: 9, amino acids No. 26 to 33), CDR2 is Ile Arg Asn Asp Gly Ser Asp Lys (SEQ ID NO: 9, amino acids No. 51 to 58), and CDR3 is Ala Lys Asn Gly Glu Ser Gly Pro Leu Asp Tyr Trp Tyr Leu Asp Leu (SEQ ID NO: 9, amino acids No. 97 to 112).

In the light chain portion, CDR1 is Leu Asp Ile Ser His Tyr (SEQ ID NO: 9, amino acids No. 166 to 171), CDR2 is Asp Ala Ser (SEQ ID NO: 9, amino acids No. 189 to 191), and CDR3 is Gln Gln Tyr Asp Asn Leu Pro Leu Thr Phe (SEQ ID NO: 9, amino acids No. 228 to 237).

Optionally, an additional Arginine is arranged at the C-terminus of SEQ ID NO: 9 or SEQ ID NO: 11.

Optionally, a Treg cell expressing the CAR-A*02 is genetically manipulated to also express exogenous hFOXP3, preferably constitutively, e.g. by introduction of an expression cassette encoding human FOXP3 concurrent with introducing the nucleic acid sequence encoding the CAR-A*02 into a Treg cell. Further optionally, in addition to or in the alternative to genetic manipulation of a Treg cell to express FOXP3, a Treg cell in addition to expressing the CAR-A*02 can be genetically manipulated to express an inducible caspase-9 dimerizer system (e.g. as described by DiStasi et al., N Engl J Med 1673-1683 (2011)) for depletion of the Treg cells following transfer into a patient.

Expression of FOXP3 with the fusion protein CAR-A*02 can be by expression of a fusion of P2A with C-terminally fused FOXP3 in one unified fusion protein, e.g. directly fused to the C-terminus of CAR-A*02. Such a fusion, e.g. encoded by one expression cassette adapted to generate one unified mRNA encoding the fusion protein of CAR-P2A-FOXP3, would yield free FOXP3 by its hydrolysis from the P2A domain. An exemplary fusion of P2A-FOXP3 is SEQ ID NO: 6, which can directly be fused to the C-Terminus of the hCD3ζ domain of the fusion protein.

The CAR-A*02 is a fusion protein comprising or consisting of a single-chain variable fragment antibody domain (scFv), a hinge, a transmembrane domain, an intracellular hCD28 signalling domain and an intracellular CD3 signalling domain, also termed hCD3ζ (hCD3 zeta) domain, which domains preferably are linked directly to one another from N-terminus to C-terminus. In the scFv domain, a variable light chain of an antibody is connected by a hinge region to a variable heavy chain of an antibody. The CAR-A*02 is characterized by its scFv domain being selected from the amino acid sequences of one of SEQ ID NO: 9 or SEQ ID NO: 11, the CD8 hinge and CD8 transmembrane domain preferably has an amino acid sequence of SEQ ID NO: 1, the CD28 signalling domain preferably has an amino acid sequence of SEQ ID NO: 2, and the CD3 signalling domain has an amino acid sequence of SEQ ID NO: 3. As the signalling domains according to the invention have a human or humanized amino acid sequence, this is herein also indicated by a "h". The hinge and can be formed by the hΔFc IgG domain, preferably of SEQ ID NO: 4. The CD8 transmembrane domain, hCD28 signalling domain and hCD3ζ signalling domain can be exchanged for a fusion of a hCD28 transmembrane domain, hCD28 signalling domain and the hCD3ζ signalling domain, preferably of SEQ ID NO: 5.

The CAR-A*02 fusion protein has the advantage that it is highly specific for the HLA-A*02. Its expression in Tregs leads to an enhancement of Treg proliferation in the presence of HLA-A*02 and results in increased Teff (effector T-cell) suppressor activity.

The fusion protein CAR-A*02 can be expressed in a Treg from a nucleic acid sequence encoding the fusion protein in an expression cassette. Optionally, the expression cassette encoding the fusion protein CAR-A*02 is contained in a viral vector for introduction of the nucleic acid sequence, e.g. by transduction using a viral particle containing the viral vector.

For in vitro production of Treg cells expressing the CAR-A*02, Treg cells originating from the recipient of the transplant, who can be a future recipient or a recipient having received a transplant, are used preferably. Treg cells (Tregs) are CD4+, CD25high and CD127low and have to be isolated from HLA-A*02 negative patients, e.g. from a blood sample by cell sorting, e.g. using FACS or magnetic beads with specific antibodies. Treg cells are CD4+, CD25high and CD127low and have to be isolated e.g. from a blood sample by cell sorting, e.g. using FACS or magnetic beads with specific antibodies It is an advantage of the Treg cells expressing the CAR-A*02 that prior to introduction into the patient and respectively following the introduction of the nucleic acid sequence encoding the CAR-A*02, no in vitro expansion is necessary prior to introducing these Treg cells into a patient. For example, no in vitro expansion comprising cultivation of these Treg cells in the presence of stimulating agents in the cultivation medium is carried out in the process for producing these Treg cells. Preferably, following introduction of the nucleic acid sequence encoding the CAR-A*02, the Treg cells are kept in culture for about 24 h to allow expression of the CAR-A*02, followed by cell sorting to isolate Treg cells expressing the CAR-A*02. In this culture, no stimulating agents for expansion are present in the culture medium, e.g. no anti-CD3 or anti-CD28 antibodies. In this culture, the culture medium contains low dose IL-2, e.g. at 50 U/mL medium, in order to keep the Treg cells from dying. It has been found that Treg cells expressing the CAR-A*02 are effective in migrating to the transplant and effective in suppressing a cytotoxic response directed against the transplant and that the Treg cells expressing the CAR-A*02 have a stable suppression activity.

The scFv domain of the CAR-A*02 is very specific for the HLA-A*02, and to-date, no cross-reactivity or off-toxicity was found. Further, no intrinsic activity or self-activation of the CAR-A*02 was found, excluding a suppressive activity independent from the presence of HLA-A*02. The suppressive activity of Treg cells expressing the CAR-A*02 was found to be drastically higher than the suppressive activity of naïve Treg (nTreg) cells.

The CAR-A*02 can be used in a process for producing Treg cells having suppressive activity in the presence of HLA-A*02 by introducing a coding sequence for CAR-A*02 into Treg cells originating from the donor prior to contact of the donor with HLA-A*02, or into Treg cells originating from the donor following contact of the donor to HLA-A*02, e.g. from the recipient of the transplant following transplantation.

Generally preferred, the fusion protein at its N-terminus comprises a leader peptide for secretion of the fusion protein to facilitate transmembrane transport of the scFv domains and arrangement of the transmembrane (TM) domain across the cell membrane. An exemplary leader sequence is SEQ ID NO: 8, preferred for the CAR-A*02.

Figure 1B:
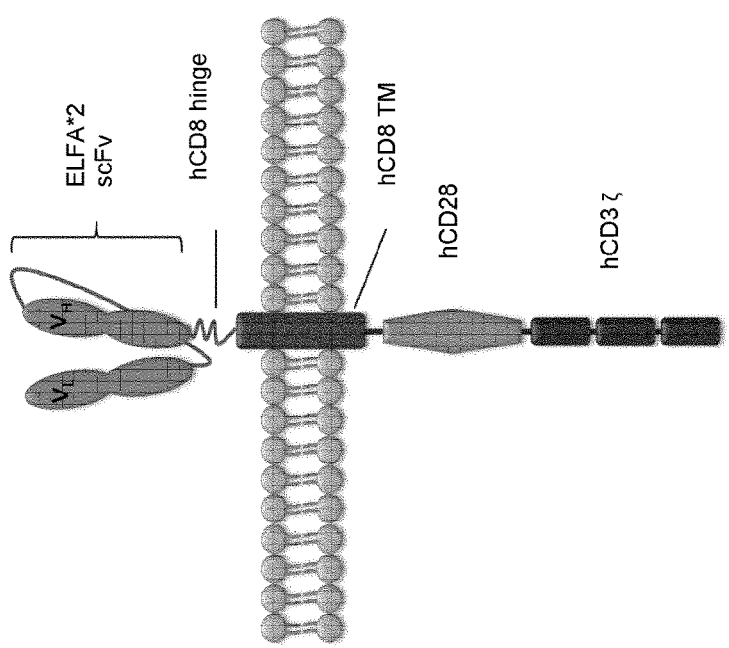
Figure 1C:
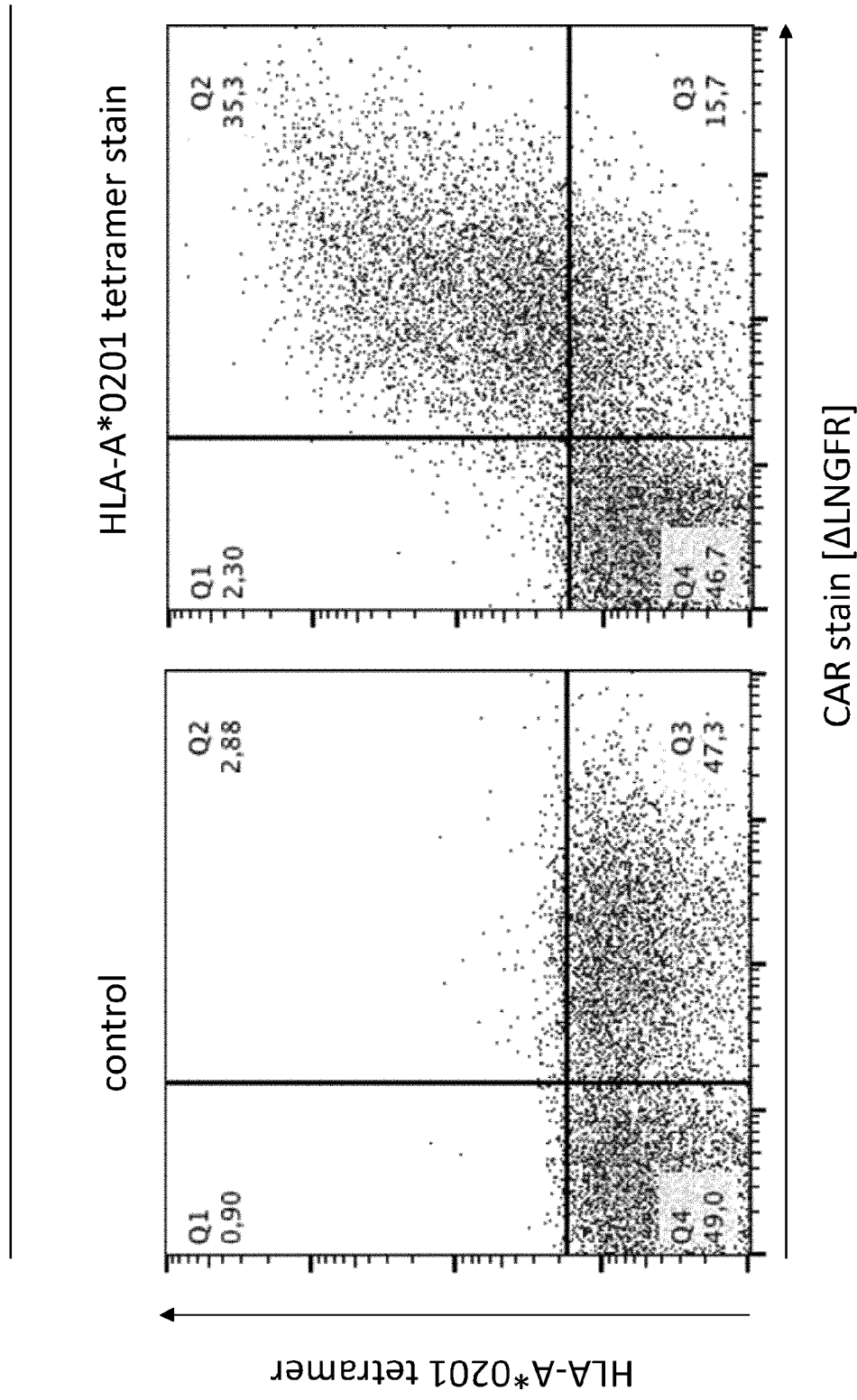

The invention is now described in greater detail by way of examples with reference to the figures, wherein FIG. 1a schematically shows a nucleic acid construct encoding a CAR-A*02 according to the invention, FIG. 1b shows a schematic model of the CAR-A*02 of FIG. 1a arranged in a cell membrane, FIG. 1c shows FACS results indicating that the CAR-A*02 transduced Tregs of the invention are highly specific to the HLA-A*02 molecule. This was shown by tetramer staining for the invention without (control) and with HLA-A*0201 tetramer staining of CAR-A*02 expressing Treg cells of the invention.

Figure 2A:
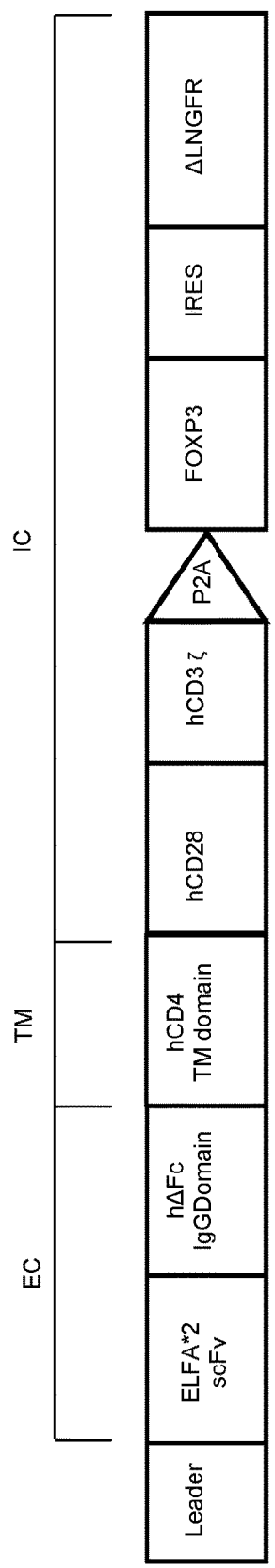
Figure 2B:
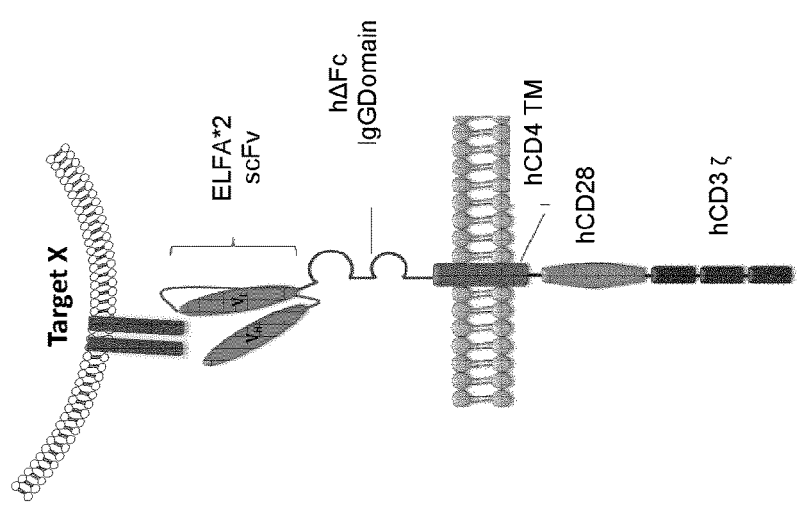
Figure 3A:
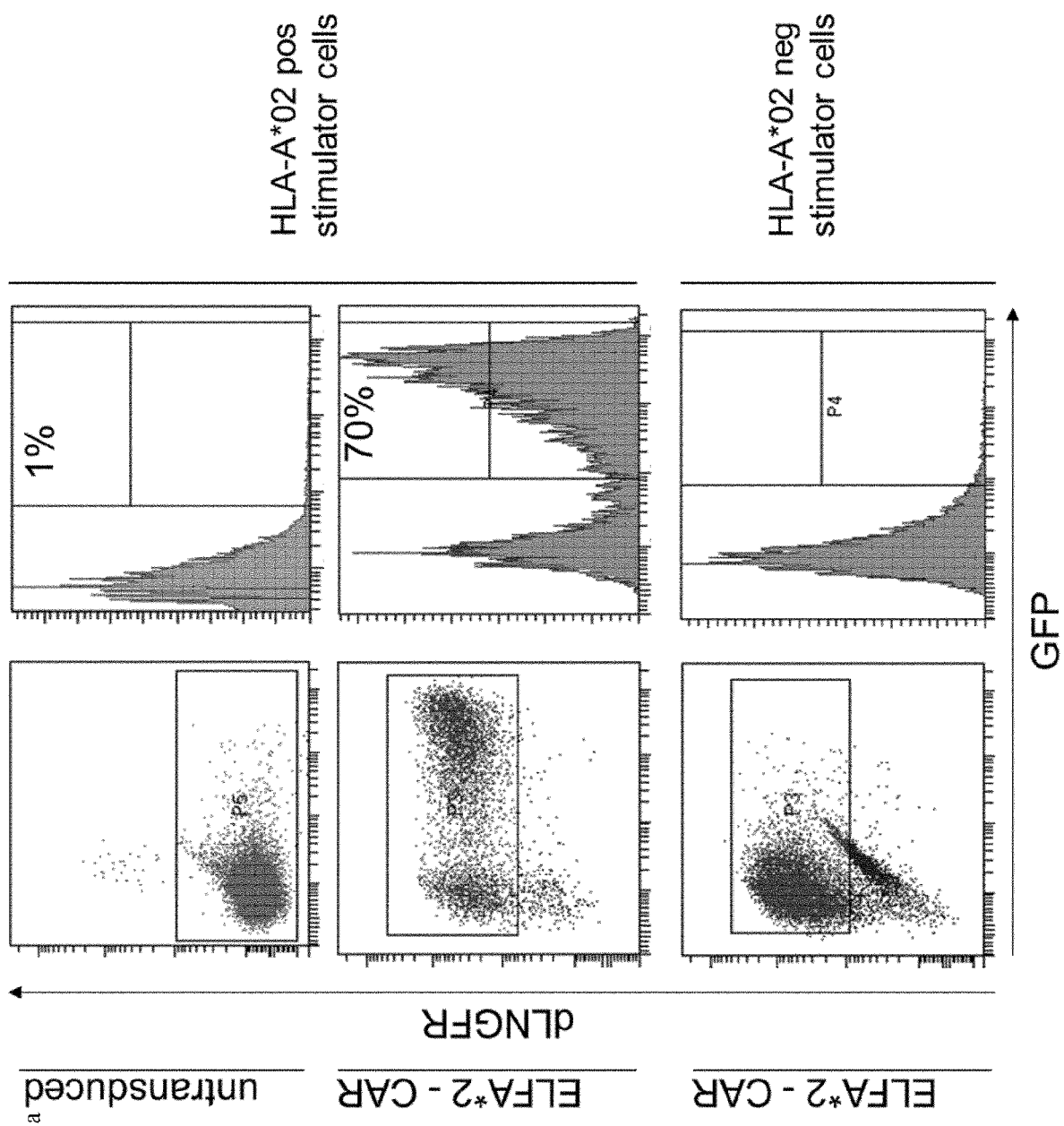
Figure 3B:
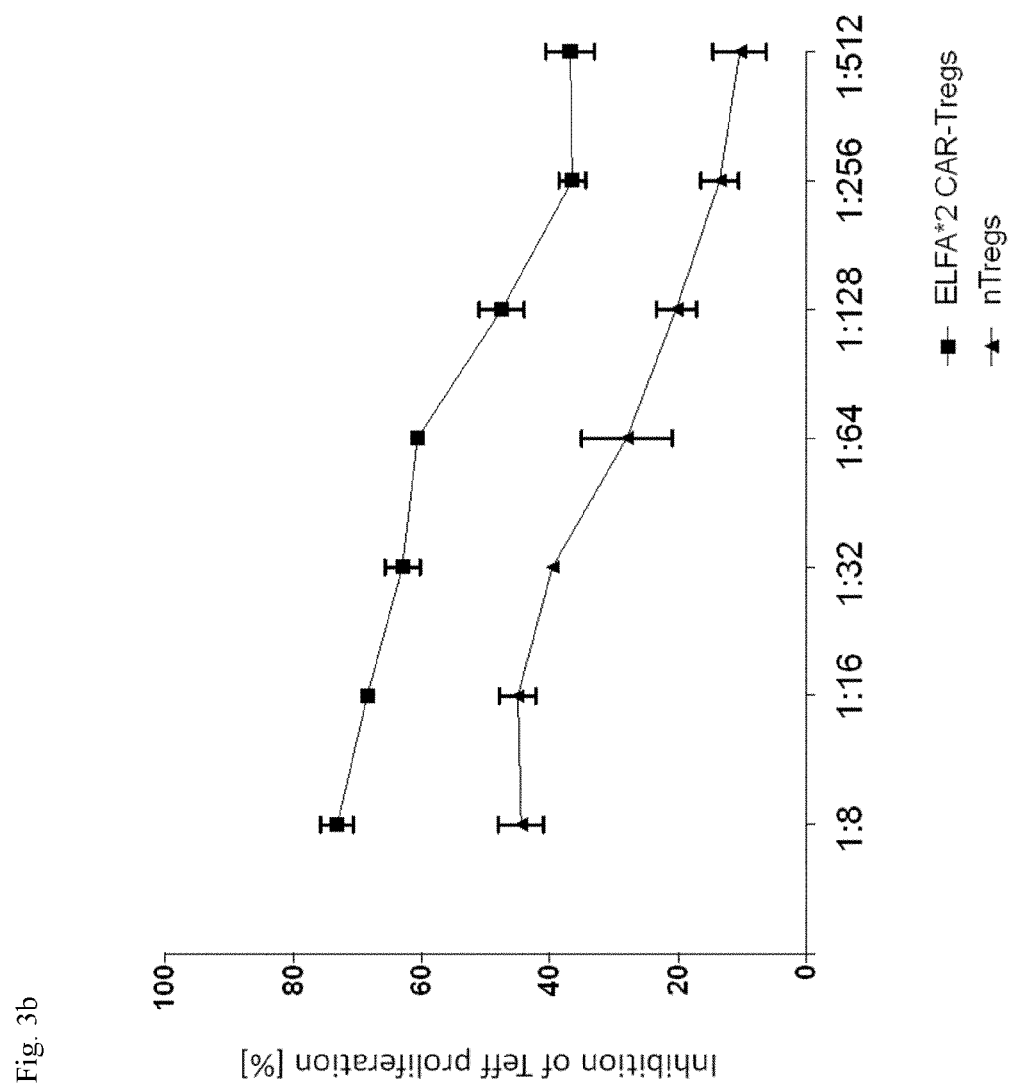
Figure 4A:
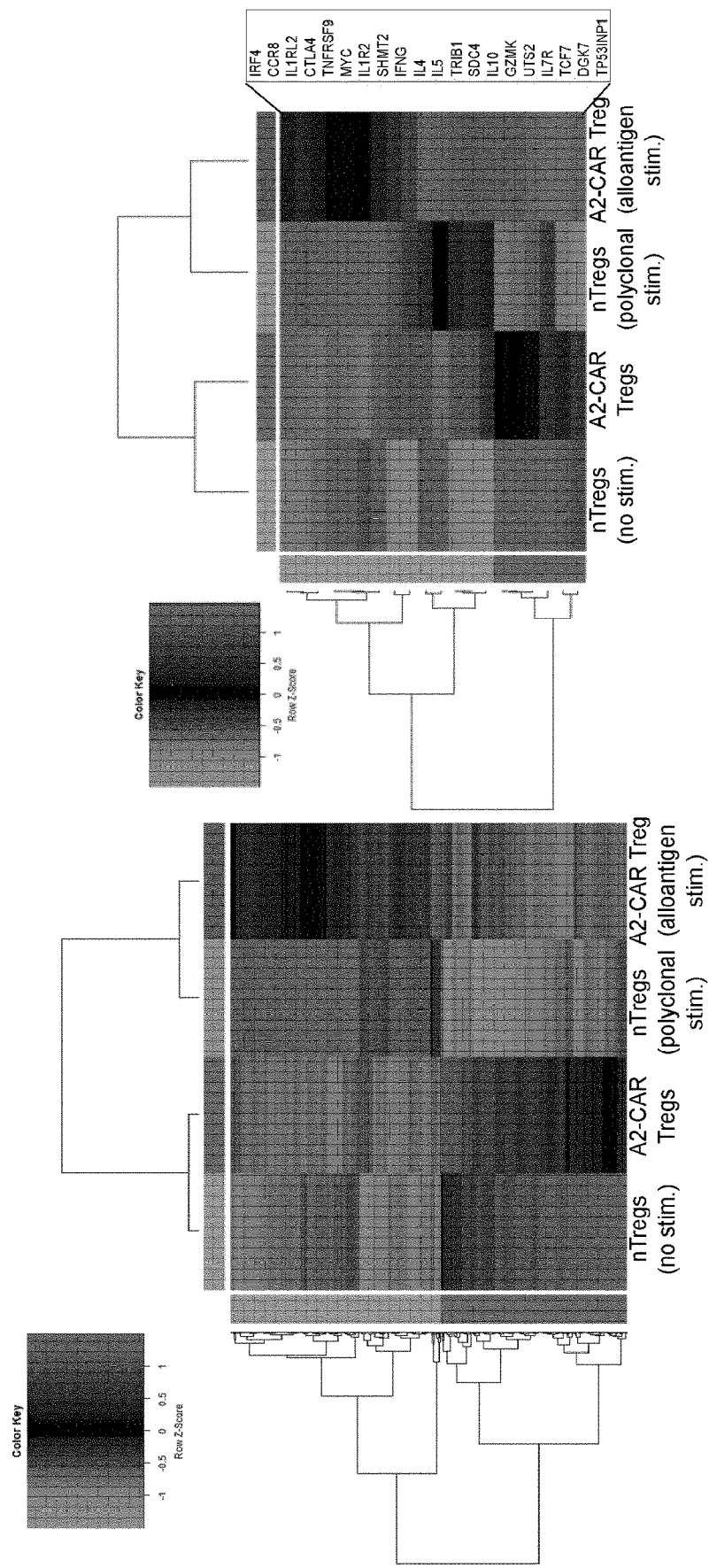
Figure 5:
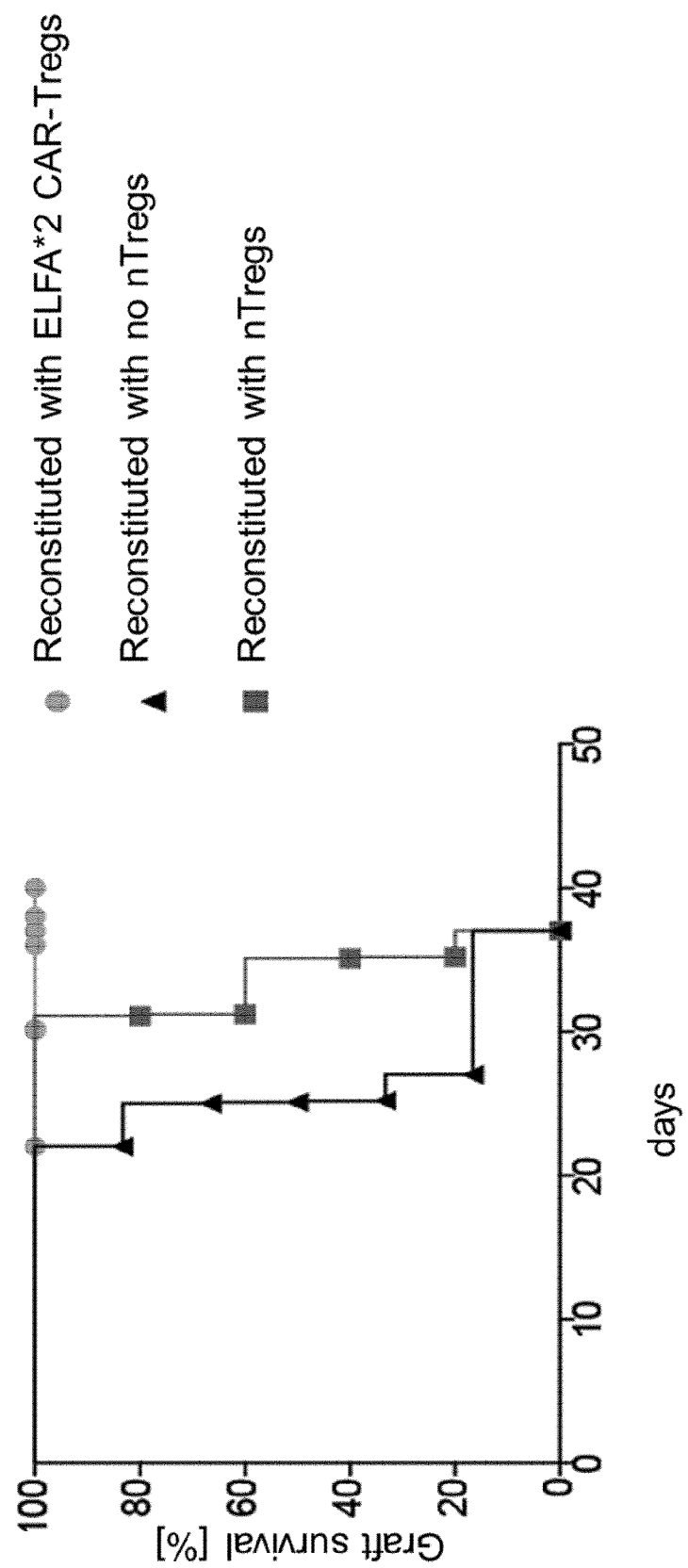
Figure 6:
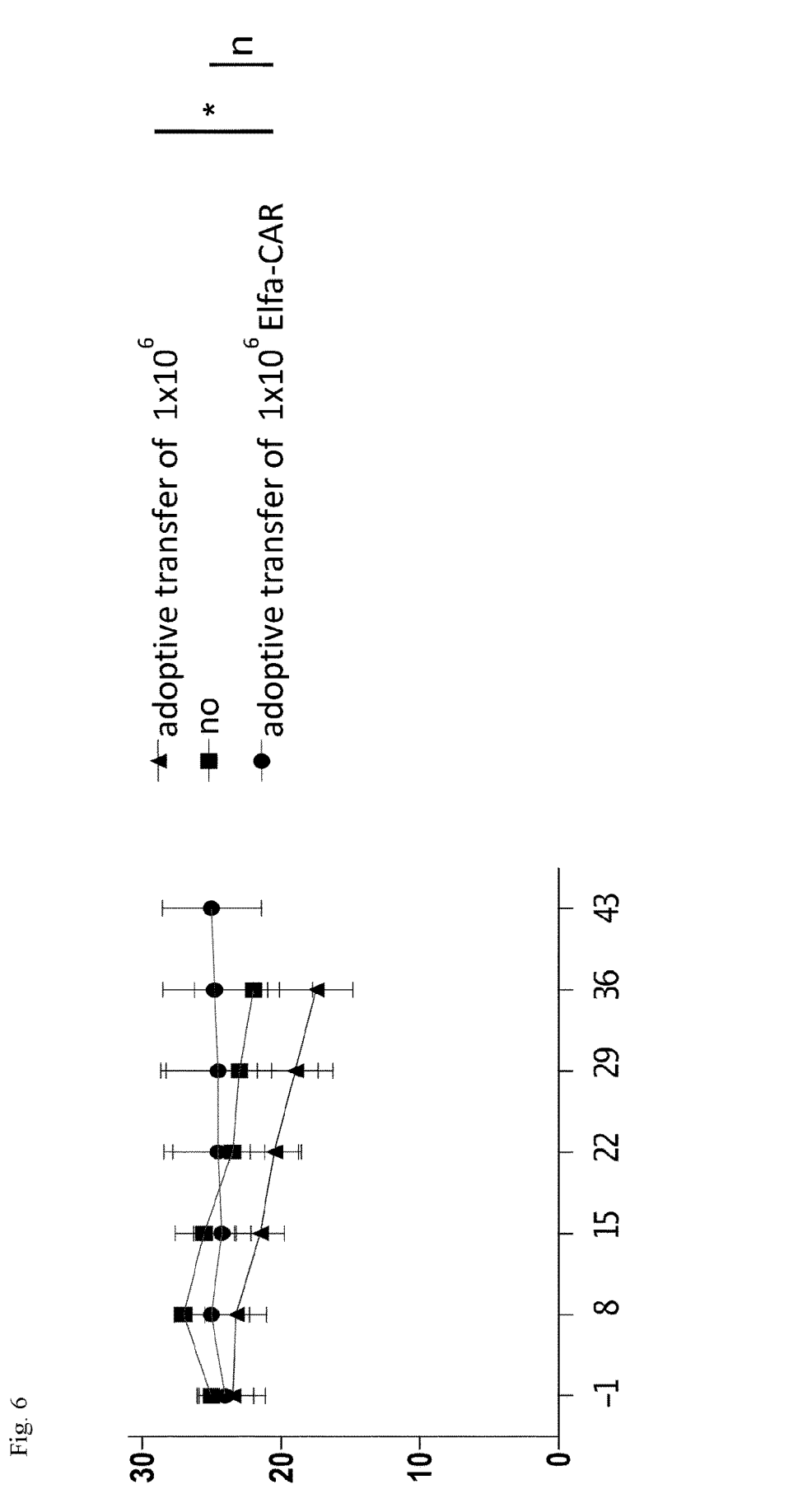

FIG. 2a schematically shows an embodiment of a nucleic acid construct encoding a CAR-A*02 of the invention, FIG. 2b shows a schematic model of the CAR-A*02 of FIG. 2a arranged in a cell membrane, FIG. 3a, shows FACS results for activation of Treg cells expressing the CAR-A*02 of the invention in response to stimulator cells, FIG. 3b shows a graph for the suppression of T-effector cells by Treg cells expressing the CAR-A*02 of the invention at different cell ratios, *=P<0.05, **=P<0.01, FIGS. 4A and 4B show a graphical analysis of a transcriptome analysis of Treg cells expressing the CAR-A*02 of the invention, FIG. 5 shows the survival, respectively rejection, of a human skin transplant on mice that have been reconstituted with Treg cells expressing the CAR-A*02 of the invention, and on comparative mice, and FIG. 6 shows the summary of the body weight over time of human PBMC reconstituted humanized mice with regard to the therapeutic intervention of GvHD development treated with CAR-A*02 expressing Tregs and nTregs compared to the untreated group.

Generally, the FACS results that are shown are representative of three independent experiments.

EXAMPLE 1: RETROVIRAL VECTOR ENCODING CAR-A*02 AND CELLS EXPRESSING CAR-A*02

The scFv domain ELFA*2 (SEQ ID NO: 9) for the CAR-A*02 of the invention was generated by affinity selection for HLA-A*02 using a phage display library expressing an anti-HLA-A*02 antibody. The anti-HLA-A*02 (nucleotide sequences accessible at EBI for heavy chain: AF163303; light chain: AF163304) was cloned from a patient who had developed A*02 reactive antibodies subsequent to blood transfusion.

As a result, the antibody corresponding to ELFA*2 could be isolated which had a significantly increased affinity for HLA-A*02 compared to the originally cloned anti-HLA-A*02 antibody, and also a significantly higher affinity for HLA-A*02 compared to the scFv described in WO2018/001874.

The coding sequence for this scFv domain was cloned to generate a coding sequence for one fusion protein, from N-terminus to C-terminus containing the variable light chain, a linker, the variable heavy chain, the hCD8 hinge domain, the hCD6 transmembrane domain, the hCD28 intracellular signalling domain and the hCD3ζ intracellular signalling domain. The coding sequence was cloned between a 5'-LTR and a 3'-LTR of a retroviral vector, which between this coding sequence for the CAR-A*02 and the 3'-LTR additionally contained the coding sequence for the non-signalling surface molecule ΔLNGFR (truncated low-affinity nerve growth factor) as a reporter protein under the control of an IRES (internal ribosomal entry site) element acting as a promoter. In addition to its function as a reporter for expression of the CAR-A*02, such a reporter can be used for isolation of transduced cells, e.g. by affinity isolation using antibody specific for the reporter and coupled to a carrier, e.g. to magnetic beads.

For transduction, the nucleic acid sequence encoding the CAR-A*02 containing ELFA*2 was cloned into a gamma-retroviral LTR-driven expression vector.

The reporter ΔLNGFR was detected by flow cytometry using anti-CD271 antibody (C40-1457, Becton Dickinson).

For introduction of nucleic acid sequences encoding the CAR-A*02, a reporter, e.g. ΔLNGFR, were contained in a retroviral vector, producing viral particles containing the vector as described by Galla et al., Nuc. Ac. Res. 39, 1721-1731 (2009). After isolation of Treg cells, which are considered nTreg cells, these were stimulated with plate-bound anti-CD3 antibody (OKT-3, 5 μg/mL) and soluble anti-CD28 antibody (CD28.2, obtained from BioLegend, 5 μg/mL) in complete medium for 48 h. Prior to transduction, protamine sulfate (4 μg/mL, obtained from Sigma) was added to the Treg cultures. Treg cells were spin-infected with retroviral particles encoding CAR-A*02 or the control CAR specific for PE at 31° C. at 700×g for 1.5 h.

After transduction with the expression vector for the control CAR, SC-1 cells could be immunologically stained for ΔLNGFR by anti-CD271 antibody and stained for scFv using anti-IgG-Fab (obtained from Jackson Lab.), demonstrating surface expression of the control CAR and recognition of PE by the control CAR. Although the SC-1 cells do not express either FOXP3 or B220, they stain positive with a PE-conjugated antibody.

Human Treg cells were isolated from human PBMC using FACS with the following antibody combinations: anti-CD8 (HIT8a, obtained from BioLegend), anti-CD4 (RPA-T4, obtained from Becton Dickinson), anti-CD25 (M-A251, obtained from Becton Dickinson), anti-CD127 (hIL-7R-M21, obtained from Becton Dickinson), resulting in isolation of CD8⁻ CD4⁺ C25$^{high}$, CD8⁻ CD4⁺ C25$^{high}$ CD127$^{low}$ Tregs with a purity of at least 90%. The PBMC preparation was produced by density gradient centrifugation over Ficoll-Paque Plus (obtained from GE Healthcare) from different HLA-typed healthy donors after ethical approval and individual written informed consent.

Treg cells were transduced as described by Galla et al., Nuc. Ac. Res. 39, 1721-1731 (2009). Generally, all T-cell cultures and all T-cell related assays were performed in complete medium (RPMI 1640 GlutaMax-I (obtained from Gibco), supplemented with 10% fetal bovine serum (FBS) (obtained from Gibco), 1% penicillin and streptomycin (obtained from Biochrom), 0.05 mM β-mercaptoethanol (obtained from Gibco), 20 mM HEPES (obtained from Gibco), 1% sodium pyruvate (obtained from Gibco) and 500 IU/mL IL-2 (Proleukin, obtained from Novartis) in humidified incubators at 37° C. and 5% $CO_2$. All cell lines were tested negative for *Mycoplasma*.

FIG. 1a shows the arrangement of the nucleic acid construct of the CAR-A*02 including the coding sequence for the reporter ΔLNGFR under the control of an IRES element flanked by a 5'-LTR and a 3'-LTR of the gamma-retroviral vector. Generally, expression of a membrane bound protein in a Treg cell, e.g. under the control of an IRES linked to the coding sequence for the CAR-A*02, preferably in a viral vector, can be used for isolation of genetically manipulated Treg cells by affinity isolation directed to the membrane bound protein. An example for such a membrane bound protein is the ΔLNGFR.

FIG. 1b shows a model of the CAR-A*02 with its transmembrane domain spanning a cell membrane and the scFv arranged on the outer cell surface and the intracellular signalling domains arranged within the cytoplasm.

An alternative embodiment of the CAR-A*02 containing ELFA*2 as its scFv domain is shown in FIG. 2a, and a model in FIG. 2b. In this embodiment, the extracellular components (EC) consist of the ELFA*2 scFv and the hΔFc IgG domain as a hinge, the transmembrane domain (TM) is the hCD4 TM domain, and the intracellular components (IC) of the CAR consist of the hCD28 signalling domain and the hCD3ζ signalling domain. With a P2A domain encoded, the translation product also comprises FOXP3 and, with an IRES, the reporter ΔLNGFR. The model of FIG. 2b indicates the target cell bearing HLA-A*02 as the target antigen (Target X) of the CAR.

Membrane-anchored expression of the fusion protein on the surface of cells was tested using transduction of hybridoma cells. In short, hybridoma cells were transduced with the retroviral vectors encoding a CAR-A*02 or the negative control fusion protein. Stimulation of the transduced hybridoma cells was by contact with various HLA-A*02 positive or HLA-A*02 negative human PBMC (peripheral blood mononuclear cells). Co-culture was for 20 h with transduced hybridoma cells and irradiated (30 Gy). For specific staining of ΔLNGFR, an anti-CD271 antibody, C40-1457 (obtained from Becton Dickinson) was used, for specific staining of the CAR-A*02, the monoclonal antibody (mAb) anti-IgG-F(ab) (obtained from Jackson Labs) was used. Analysis was generally made by flow cytometry using a flow cytometer FACSCalibur (Becton Dickinson) or a LSRII (Becton Dickinson) using the FACSDiva software and FlowJo Software (Tree Star Inc.). For statistical analysis, the GraphPad Prism version 7.0 was used.

Analyses showed expression and localisation of the reporter ΔLNGFR on the surface of the transduced hybridoma cells in original hybridoma cells (untransduced), staining for ΔLNGFR (control CAR) only, and staining for CAR-A*02 (A2-CAR). The results show that both the reporter ΔLNGFR and the CAR-A*02 were expressed on the surface of the transduced hybridoma cells.

Treg cells (CD4$^+$CD25$^{high}$ CD127$^{low}$) isolated from a HLA-A2*-negative individual (HLA-A*02 neg donor) were transduced by the retroviral vector to express the CAR-A*02 and the reporter ΔLNGFR. For staining, HLA I tetramers displaying a hepatitis C virus peptide (HLA-A1-CMV Pentamer, obtained as pp65 from ProImmune) were used.

The FACS results show that transduced cells were stained with the HLA A*0201 (A*0201, obtained from Beckman coulter Immunomics, San Diego, USA) tetramers.

Further FACS results show that the Treg cells from a HLA-A2*-positive person (HLA-A*02 pos donor), transduced to express the CAR-A*02 and the reporter ΔLNGFR, did not stain with A*01 tetramers.

The results showed that the CAR-A*02 is expressed on the surface of transduced Treg cells, and that it specifically recognizes the HLA-A*02 tetramers, e.g. not recognizing HLA-A*01 tetramers. Further, it was found that the specific staining by the A*02 tetramers was independent of the peptide bound to the A*02 tetramer.

As a negative control CAR, a fusion protein containing an scFv specific for phycoerythrin (PE) in the place of the scFv specific for HLA-A*02, but otherwise identical, was encoded in the same expression vector. For determining surface expression and specificity of the control CAR, SC-1 cells, foetal mouse embryo cells which lack host-range restrictions for murine leukemia viruses (ATCC CRL-1404) were transduced according to Noyan et al., Cancer gene therapy 19, 352-357 (2012). The specificity of the control CAR for phycoerythrin (PE) was assessed by the use of several PE-conjugated proteins and PE-conjugated antibodies: murine B220-PE (RA3-6B2, obtained from Caltag), murine Foxp3-PE and murine Foxp3-PacBlue (RIK-16s, obtained from eBioscience), using the eBioscience Fix/Perm Kit for intracellular Foxp3 staining according to the manufacturer's instructions. The FACS results showed that the negative control CAR is expressed on the surface of cells and recognizes PE.

The phenotype of Treg cells that express the CAR-A*02 was analysed using Treg cells obtained from HLA-A*02 negative donors in order to prevent activation of the CAR-A*02 by the Treg cells themselves after transduction. This situation approximates the situation in a HLA-A*02 negative recipient. It was found that the transduction did essentially not affect the nTreg phenotype, with similar levels of effector molecules CTLA-4 and CD39 displayed in CAR-A*02-transduced Treg cells and in non-transduced nTreg cells, and similar percentages of CD45RA+naïve Treg cells and similar expression of CCR7 were needed for homing the cells to secondary lymphoid organs. For staining, the antibodies anti-CD39 (A1, obtained from BioLegend), anti-CD45RA (HI100, obtained from Becton Dickinson), anti-CD45RO (UCHL1, obtained from BioLegend), anti-CCR7 (3D12, obtained from Becton Dickinson), anti-CTLA-4 (BNI3, obtained from Becton Dickinson), anti-FoxP3 (PCH101, obtained from eBioscience) were used in FACS analyses. The same phenotype was found for Treg cells transduced with the PE-specific control CAR.

FIG. 1c): Tregs are isolated from HLA-A*02 negative PBMCs and genetically manipulated with infectious particles encoding CAR A*02. In the FACS analysis it can be shown that only ELFA*2-CAR expressing Tregs, that can be identified by ΔLNGFR, carry a highly specific scFv against the HLA-A*02 molecule (staining by HLA-A*02 tetramer).

STAT5 phosphorylation was measured using FACS (method as described in Long et al., Diabetes, 407-415 (2010) using anti-pSTAT5 antibody (pY694, 47/SATS) obtained from Becton Dickinson) at different doses of IL-2 for Treg cells transduced with CAR-A*02 and non-transduced nTregs from the same experiment. The FACS results showed that both these Treg cells showed high levels of STAT5 phosphorylation already under the low doses of IL-2 necessary for survival of nTreg in culture. The Treg cells transduced with CAR-A*02 showed a higher baseline and a slightly higher maximum STAT5 phosphorylation level in comparison to non-transduced cells. A comparison of STAT5 phosphorylation levels in relation to IL-2 doses found that no defects in IL-2 signalling were observed. These results show that transduction of Treg cells to express CAR-A*02 did not significantly affect STAT5 phosphorylation, indicating no impairment of homing ability of these transduced cells.

For analysis of the function of CAR-A*02-transduced cells, T-cell hybridomas stably expressing a reporter construct containing an NFAT-sensitive IL-2 promoter to control GFP expression were transduced with the CAR-A*02. For detection of CAR expression in FACS analysis, the reporter ΔLNGFR was detected, NFAT stimulation was detected as expression of GFP (green fluorescent protein).

As shown in FIG. 3a, it was found that CAR-A*02-transduced cells (A2-CAR) did not show any NFAT activation nor the associated expression of GFP after transduction, but NFAT activation and GFP expression were strongly up-regulated by co-culture with HLA-A*02+PBMC acting as stimulator cells but not in response to HLA-A*02-PBMC. The non-transduced (untransduced) T-cell hybridomas and the cells that were transduced with the ΔLNGFR (control CAR) did not show a reaction to HLA-A*02 positive nor to HLA-A*02 negative PBMC stimulator cells. This result shows that the CAR-A*02 according to the invention is capable of signal transduction necessary to activate NFAT. As the hybridomas do not express any endogenous T-cell receptor (TCR), the signal transduction that was observed is entirely caused by the signalling of the CAR-A*02.

The differentiation between signalling by CAR or by TCR will be more difficult when HLA-A*02 negative donor Treg cells are transduced with the CAR-A*02, because 8 to 12% of these nTreg cells will have a TCR that also recognizes HLA-A*02. Therefore, the CAR-A*02 was tested against a wide panel of human PBMC presenting various MHC I and MHC II alleles, using expression in the T-cell hybridomas containing the reporter construct. The analysis was by flow cytometry of GFP expression. The results showed that the CAR-A*02 (HLA-A2 CAR) upon expression in the hybridomas recognized all HLA-A*02 positive donor samples without any cross-reactivity with HLA-A*02 negative blood samples. For comparison, the control CAR specific for PE (irrelevant CAR) was used. The results are summarized in the following table, wherein the individual HLA-A and HLA-B are indicated in each row for the numbered samples (Human PBMCs) and X designates GFP expression:

|  |  | HLA-A | | HLA-B | | ELFA*2-CAR | Control-CAR | untransduced |
|---|---|---|---|---|---|---|---|---|
| human PBMCs | #1 | 2 | 23 | 44 |  | X | — | — |
|  | #2 | 3 | 24 | 7 | 13 | — | — | — |
|  | #3 | 1 | 24 | 8 | 40 | — | — | — |
|  | #4 | 1 |  | 8 | 57 | — | — | — |
|  | #5 | 3 | 24 | 7 | 13 | — | — | — |
|  | #6 | 2 | 24 | 35 | 37 | X | — | — |
|  | #7 | 24 | 31 | 13 | 51 | — | — | — |
|  | #8 | 2 |  | 51 | 62 | X | — | — |
|  | #9 | 2 |  | 60 | 61 | X | — | — |
|  | #10 | 2 | 3 | 38 | 44 | X | — | — |
|  | #11 | 3 | 25 | 7 | 18 | — | — | — |
|  | #12 | 2 | 25 | 35 | 44 | X | — | — |
|  | #13 | 11 | 23 | 27 | 44 | — | — | — |
|  | #14 | 2 | 31 | 62 | 27 | X | — | — |
|  | #15 | 3 |  | 7 | 62 | — | — | — |
|  | #16 | 3 | 30 | 7 | 13 | — | — | — |
|  | #17 | 2 | 24 | 7 | 62 | X | — | — |
|  | #18 | 3 |  | 35 |  | — | — | — |
|  | #19 | 2 | 3 | 13 | 18 | X | — | — |
|  | #20 | 1 | 2 | 27 | 60 | X | — | — |

The hybridoma cells expressing the control CAR after co-culture with the blood samples did not express GFP (−) for any of the HLA. This demonstrated the high specificity of the CAR-A*02 with ELFA*2 as its scFv according to the invention for HLA-A*02, showing low or absent unspecific or off-target activity.

The effect of activating the CAR-A*02 according to the invention when it is expressed in human HLA-A*02 negative Treg cells was tested using HLA-A*02 positive PBMC as stimulator cells. Proliferation of Treg cells expressing the CAR-A*02 was analysed based on a CFSE dilution assay, for which the Treg cells were labelled with CFSE (5 mM, obtained from Invitrogen). For the HLA-A*02 negative Treg cells expressing the CAR-A*02 polyclonal stimulation was used by co-cultivation with irradiated (30 Gy) HLA-A*02 positive PBMC (stimulator cells) which were also contacted with 5 mM APC cell proliferation dye (eFluor 670, obtained from eBioscience) in a 1:4 ratio. For the human HLA-A*02 negative Treg cells transduced to express the control CAR (specific for PE), stimulation was by anti-CD3/anti-CD28 directed to the TCR. Detection of CD39 using anti-CD39 antibody (A1, BioLegend) was measured for Treg activation, and CFSE was detected for proliferation. For comparison, FACS analysis of a CFSE dilution assay of proliferating cells was made. The FACS results are depicted in FIG. 3b, showing that the CAR-A*02 was strongly activated by HLA-A*02 positive PBMC, resulting in a strong proliferation and up-regulation of the CD39 effector molecule. This effect was much stronger than in the activated Treg cells expressing the control CAR. The Treg cells expressing the control CAR are likely activated via their allospecific TCR, as this is found on up to 12% of all nTreg cells. The up-regulation of CD39 was also found upon activation using the combination of anti-CD3 and anti-CD28 antibodies, which act on the TCR. These data indicate that the Treg cells expressing the CAR-A*02 according to the invention can be activated equally well via the CAR-A*02 or via the TCR.

It is assumed that the high proliferative capacity of the Treg cells expressing the CAR-A*02 according to the invention after transfer into a patient supports their effect, e.g. their niche filling capability.

EXAMPLE 2: SUPPRESSOR ACTIVITY OF CAR-A*02 IN VITRO

The suppressor activity of Treg cells expressing the CAR-A*02 of Example 1 was tested by assaying the suppression of an allogeneic mixed lymphocyte reaction (MLR) directed against HLA-A*02 positive CD1c stimulator cells. The responder cells were CFSE labelled (5 mM) isolated CD4+CD25− effector T-cells that were co-cultured with isolated HLA-A*02 CD1c+ cells in the presence of various ratios of syngeneic HLA-A1 CD4$^+$CD25$^+$CD127$^{low}$ Treg (nTreg) cells or syngeneic Treg cells expressing the CAR-A*02 for five days. Suppression of syngeneic effector T-cell proliferation was calculated on the basis of the ratios Treg/Teff via a CFSE dilution assay. For comparison, non-transduced nTreg cells from the same transduction experiment were used.

The regulative capacity of Treg-CAR-ELFA*2 is depicted in FIG. 3b, showing that the Treg cells expressing the ELFA*2 (A2-CAR Tregs) are much more potent in the inhibition of allospecific effector T cells proliferation compared to the non-transduced Treg cells (nTregs). The Treg cells expressing the ELFA*2-CAR were far more potent suppressors at almost all ratios of the CAR-A*02-expressing Treg/effector T-cells tested. Even at a ratio of 1:64 of CAR-A*02-expressing Treg/effector T-cells (ratio Treg/Teff), inhibition of over 80% was observed, demonstrating the strong suppressive activity conferred by the fusion protein comprising ELFA*2 as the scFv domain.

For analysis of the consequences of signalling in Treg cells by CAR-A*02, a transcriptome analysis comprising 1149 genes was made by deep sequencing in non-activated and CAR-A*02 expressing Treg cells and compared to the results obtained for non-transduced Treg cells. The CAR-A*02 expressing Treg cells (CD4$^+$CD25$^{high}$CD127$^{low}$) were activated with irradiated (30 Gy) HLA-A*02+PBMC as stimulator cells by co-culture for 36 h. As a control, non-transduced Treg cells were left untreated or were stimulated via their TCR by the combined anti-CD3/anti-CD28 antibodies, for 48 h. After stimulation, RNA was isolated using the MicroRNeasy kit (obtained from Qiagen), quality and integrity of total RNA was measured on an Agilent Technologies 2100 Bioanalyser. An RNA sequencing library was generated from 100 ng total RNA using TruSeq RNA Sample Prep kits v2 (obtained from Illumina) for mRNA purification followed by ScriptSeq v2 RNA Seq Library Preparation kit (obtained from Epicentre) according to the manufacturer's protocols. The libraries were sequenced on an Illumina HiSeq2500 device using TruSeq SBS kit v3-HS (50 cycles, single ended run) with an average of $3 \times 10^7$ readings per RNA sample. Readings were aligned to the reference genome hg19 using the open source short read aligner STAR with default settings. The readings per gene after alignment were made by the feature.count function of the R package termed Rsubread. For log 2 transformation of raw count data followed by data normalisation and statistical determination of differentially expressed genes, the R package termed edgeR was used.

The graphical representation of the result (heat map, horizontal bars highlight individual samples, vertical bars indicate major gene clusters) is shown in FIG. 4A for the nTreg cells activated via their TCR by anti-CD3/anti-CD28, and nTreg cells transduced to express the CAR-A*02 were activated by presence of HLA-A*02-positive responder cells. FIG. 4B shows the graphical analysis (centralized log 2 intensity values, z-score) of the expression levels of a subset of genes differentially expressed after TCR activation (1149 genes, FDR<0.05) with relation to Treg function and phenotype. It was found that the CAR-A*02 transduced Treg cells and the non-transduced Treg cells had a very similar pattern of activated and down-regulated transcripts, supporting the notion that signalling via the CAR-A*02 leads to comparable transcriptional profiles in Treg cells as signalling via the TCR. The activation of the CAR-A*02 or of the TCR, respectively, resulted in drastic changes of the transcriptional profiles compared to the non-activated state, but the transcriptional profiles of both activated states were similar to one another. An analysis of specific genes that are involved in Treg cell function and their homing revealed subtle differences. The CAR-A*02 activated Treg cells expressed higher amounts of IL-4, IL-5 and IL-10 but slightly lower transcript numbers of CTLA4 and IL-2R. These decreased transcript levels had no apparent consequence for CTLA4 protein expression, nor for IL-2 signalling.

EXAMPLE 3: SUPPRESSOR ACTIVITY OF CAR-A*02 IN VIVO

As an example for suppressor activity in vivo, humanized non-obese diabetic (NOD)-RAG1$^{null}$IL2$\gamma^{null}$ (NRG) mice, non-reconstituted, received 5×10$^4$ CD4$^+$CD25$^+$CD127$^{low}$ human Treg cells from HLA-A*02 negative donors, which Treg cells were transduced with the retroviral vector encoding the CAR-A*02 according to Example 1, or the same Treg cells transduced with the control CAR (specific for PE) of Example 1, or the non-transduced Treg cells. As an example for transplanted tissue, mice were injected into each ear pinnae with admixed 5×10$^5$ irradiated syngeneic HLA-A*01 PBMC and allogeneic irradiated HLA-A*02 PBMC as an in vivo MLR.

These experiments were performed in a blinded manner. For determining the suppressor activity, ear swelling was measured using a spring-loaded digital thickness gauge. The results of the ear swelling test, calculated as the difference between ear thickness prior to injection and 24 h after injection, with each value related to the ear swelling observed in the other ear of the animal that had not been injected with Treg cells as an internal control.

The result showed a significantly stronger inhibition of the allogeneic mixed lymphocyte reaction for the Treg cells expressing CAR-A*02 (A2-CAR Tregs) in comparison to Treg cells expressing the control CAR (control CAR Tregs) and in comparison to the non-transduced Tregs (CD4+ CD25high Tregs).

In another experiment, the suppressor activity was analysed in immune reconstituted NRG mice. Currently, testing transplant rejection in such mice is difficult, because in immunocompetent mice, an allogeneic skin transplant is rejected within 10 d, while a similar rejection in humanized NRG mice does not occur before day 30 after transplantation. At this late point in time, xenospecific graft-versus-host responses already become evident after immune reconstitution. In order to avoid other effects than the GvHD reaction, a stringent rejection model was used in which allogeneic transplanted cells are completely rejected by day 5 after transplantation by injection. The use of injected allogeneic transplant cells has the additional advantage that homing of Treg cells to transplanted tissues should not play a major role because the immune response is initiated in the spleen, therefore avoiding possible effects of the perturbed homing in humanized mice.

As Treg cells, CD4$^+$CD25$^+$CD127$^{low}$ human Treg cells transduced with CAR-A*02 according to Example 1, or the same Treg cells transduced with the control CAR (specific for PE) of Example 1, or the non-transduced Treg cells were used. Immune reconstitution was monitored by FACS 14 d after reconstitution by expression of human CD8 and human CD4 in peripheral blood samples from the mandibular vein. Animals with no perceptible reconstitution of human CD8 and CD4 T cells were excluded from experiments. On day 14 after immune reconstitution, mice were injected i.v. with 5×10$^5$ syngeneic PBMC labelled with CFSE and 5×10$^5$ HLA-A*02 PBMC as allogeneic positive target cells which were labelled with APC proliferation dye. Simultaneously, different animals received different Treg cells at 5×10$^4$, which were Treg expressing CAR-A*02 (plus A2-CAR Tregs) or control CAR (plus control CAR Tregs) or non-transduced (plus nTregs). Five days after injection, mice were sacrificed and blood and splenic cells were analysed for allogeneic targets and syngeneic donor cells, and compared to those obtained in animals that did not receive Treg cells (no add. Tregs). The labelling of syngeneic and allogeneic cells allowed to assess the relative killing of allogeneic target cells in the animals as both cell populations were injected at a 1:1 cell ratio.

Representative FACS results showed that in immunocompetent mice allogeneic target cells were no longer detected after 120 h after transplantation, corresponding to the fast rejection of allogeneic tissue in non-humanized mice. The injection of Tregs expressing the control CAR or of non-transduced Tregs had a small effect in preventing killing of allogeneic target cells, the transfer of Treg cells expressing a CAR-A*02 completely prevented the rejection of allogeneic target cells.

EXAMPLE 4: SUPPRESSOR ACTIVITY OF CAR-A*02 IN VIVO

As an example for suppressor activity in vivo, n=6 humanized non-obese diabetic (NOD)-RAG1$^{null}$IL2$\gamma^{null}$ NRG) mice, non-reconstituted, received 5×10$^4$ CD4$^+$CD25$^+$ CD127$^{low}$ human Treg cells from HLA-A*02 negative donors, which Treg cells were transduced with the retroviral vector encoding the CAR-A*02 according to Example 1, or (n=7) the same Treg cells transduced with the control CAR (specific for PE, comparative) of Example 1, or non-transduced nTreg cells (n=5, comparative). As an example for transplanted tissue, mice received a human skin, 15 mm×15 mm, as a graft, replacing a portion of their natural skin.

The human skin was obtained from the Department of Plastic, Aesthetic, Hand and Reconstructive Surgery, Hannover Medical School, Hannover, Germany.

The survival is represented in FIG. 5, showing that the Treg cells containing the CAR-A*02 (●) according to the invention inhibits the rejection of the transplant, the mice without reconstitution by Treg cells (▲) rejected the transplant until day 30, and mice reconstituted with nTreg cells (■) showed an non-significant longer survival of the transplant (37 d).

These results shows that the CAR-A*02 according to the invention expressed in Treg cells also in the absence of any immunosuppression results in a complete adoption of the transplant expressing HLA A*02.

EXAMPLE 5: SUPPRESSOR ACTIVITY OF CAR-A*02 IN VIVO

As a further in vivo demonstration of the suppressor activity of Treg cells expressing the CAR-A*02 of the invention, immune-incompetent (NRG, lacking T-cells, B-cells and NK-cells) mice were injected with human PBMC in order to reconstitute the presence of immune cells. After 14 d following injection of human PBMC, human T-cells can be detected in such reconstituted mice, as the injected human cells can develop rapidly in these mice that originally contained no murine immune cells. As a consequence of the presence of the human immune cells, the mice at approximately day 30 after the injection develop an adverse immune reaction of the human immune cells against the murine cells, which is a GvH disease, as the injected human immune cells from the PBMC (graft) attack the murine host.

After the successful transfer of human PBMC on day −1 into four mice, animals each were assigned to two reconstituted groups (n=5), one contemporaneously receiving 1×10⁶ Tregs expressing the CAR-A*02 of the invention, one contemporaneously receiving 1×10⁶ Tregs without CAR expression (nTregs), wherein the Tregs were HLA-A*011, i.e. HLA-A*02 negative. The PBMC were HLA-A*02 positive. The result shows that the Treg cells expressing the CAR-A*02 abolished the immune reaction of the graft against the murine host.

FIG. 6 depicts the course of body weights for the group having received the Treg cells expressing the CAR-A*02 (●, adoptive transfer of 1×10⁶ Elfa-CAR Tregs), for the group having received Treg cells without CAR expression (▲, adoptive transfer of 1×10⁶ nTregs, natural Tregs), and for the group without injection of PBMC and without Tregs (■, no reconstitution), with p-value **=0,043. Further, the usual indicators of GvH disease, shaggy fur and inflamed eyes, were absent only in the mice that had received the Treg cells expressing the CAR-A*02. The animals that had received PBMC and nTregs showed severe loss of body weight, indicating the unrestricted adverse immune reaction of the PBMC against the murine cells, indicating that the Tregs without CAR could not regulate this immune reaction. The mice that had received both the reconstituting PBMC and the Treg cells expressing the CAR of the invention showed stable to increasing body weights, indicating the absence of an adverse immune response due to the presence of the Treg cells suppressing the immune reaction of the reconstituting PBMC.

The invention claimed is:

1. A fusion protein comprising a single-chain variable fragment antibody domain (scFv), a hinge, a transmembrane domain, an intracellular hCD28 signalling domain and an intracellular hCD3ζ (hCD3 zeta) signalling domain forming a chimeric antigen receptor having specificity for HLA-A*02 (CAR-A*02) for use in the treatment of HvG disease in a patient, wherein the single-chain variable fragment antibody domain (scFv) has an amino acid sequence which is SEQ ID NO: 9.

2. The fusion protein according to claim 1, wherein the intracellular signalling domain comprises a hCD28 signalling domain and an intracellular hCD3ζ (hCD3 zeta) signalling domain.

3. The fusion protein according to claim 1, wherein the hinge and the transmembrane domain have the amino acid sequence of SEQ ID NO: 1, the hCD28 signalling domain has the amino acid sequence of SEQ ID NO: 2, and the hCD3ζ (hCD3 zeta) signalling domain has the amino acid sequence of SEQ ID NO: 3.

4. The fusion protein according to claim 2, wherein the hinge is a hΔFc IgG domain having the amino acid sequence of SEQ ID NO: 4.

5. The fusion protein according to claim 1, wherein the hinge and the transmembrane domain, which is a CD8 hinge and a CD8 transmembrane domain, have the amino acid sequence of SEQ ID NO: 1, the hCD28 signalling domain has the amino acid sequence of SEQ ID NO: 2, and the hCD3ζ domain has the amino acid sequence of SEQ ID NO: 3, or the hCD28 signalling domain including the hCD3ζ signalling domain have the amino acid sequence of SEQ ID NO: 5.

6. A CD4+CD25+CD127$^{low}$ HLA-A*02 negative human regulatory T (Treg) cell expressing the fusion protein according to claim 1.

7. The fusion protein according to claim 1, wherein the patient is HLA-A*02 negative and in that the patient contains or is intended to contain a solid tissue transplant which is HLA-A*02 positive.

8. The fusion protein according to claim 1, wherein a signal peptide of SEQ ID NO: 10 is linked at the N-terminus of SEQ ID NO: 9.

9. The fusion protein according to claim 1, comprising or consisting of, from N-terminus to C-terminal, one scFv domain having the amino acid sequence of SEQ ID NO: 9, a hinge and a transmembrane domain having the amino acid sequence of SEQ ID NO: 1, a hCD28 signalling domain having the amino acid sequence of SEQ ID NO: 2, and a hCD3ζ (hCD3 zeta) signalling domain having the amino acid sequence of SEQ ID NO: 3, and a signal peptide of SEQ ID NO: 10 at the N-terminus.

10. The fusion protein according to claim 1, comprising or consisting of, from N-terminal to C-terminal, one scFv domain having the amino acid sequence of SEQ ID NO: 9, a hΔFc IgG domain as a hinge having the amino acid sequence of SEQ ID NO: 4, a hCD28 transmembrane domain and a hCD28/hCD3 signalling domain having the amino acid sequence of SEQ ID NO: 5, and a signal peptide of SEQ ID NO: 10 at the N-terminus.

11. The fusion protein according to claim 1, expressed from a nucleic acid sequence encoding the fusion protein with optionally an additional N-terminal secretory leader peptide.

12. The fusion protein according to claim 1, expressed from a nucleic acid sequence encoding the fusion protein with an additional N-terminal secretory leader peptide and an additional C-terminal P2A-hFOXP3 having the amino acid sequence of SEQ ID NO: 6.

13. The fusion protein according to claim 11, wherein the leader peptide has the amino acid sequence of SEQ ID NO: 8.

14. The fusion protein according to claim 1, wherein when the fusion protein is expressed in a CD4+CD25+CD127$^{low}$ HLA-A*02 negative human regulatory T (Treg) cell in the presence of HLA-A*02 positive solid tissue, the Treg cell has suppressor activity.

15. The fusion protein according to claim 1, wherein when the fusion protein is expressed in a CD4+CD25+CD127$^{low}$ HLA-A*02 negative human regulatory T (Treg) cell, the Treg cell has homing capability to secondary lymphoid organs.

16. A process for providing a human regulatory T (Treg) cell having suppressor activity in the presence of HLA-A*02 positive solid tissue, comprising the steps of
   a. isolating from a blood sample CD4+CD25+CD127$^{low}$ human regulatory T (Treg) cells to produce isolated Treg cells,
   b. introducing a nucleic acid sequence encoding and expressing a fusion protein according to claim 1 into the isolated Treg cells to produce Treg cells expressing the fusion protein,
   wherein the Treg cells expressing the fusion protein are not expanded in an in vitro culture.

17. The process according to claim 16, wherein isolating the human regulatory T cells is isolating HLA-A*02 negative human regulatory T cells.

18. The process according to claim 16, wherein the nucleic acid sequence is comprised in a retroviral vector that is packaged in a retroviral particle and is introduced into the isolated Treg cells by transduction.

19. The process according to claim 16, wherein following step b., the Treg cells are kept in culture for 24 h, followed by isolating Treg cells expressing the fusion protein.

20. The process according to claim 19, wherein the Treg cells are kept in culture in a medium containing low dose IL-2, which medium does not contain an agent stimulating expansion of Treg cells.

21. A Treg cell containing a nucleic acid construct encoding a fusion protein according to claim 1.

22. A method of treating HvG disease in a patient, said method comprising administering to said patient the Treg cell of claim 6.

* * * * *